US009918065B2

(12) United States Patent
Geiss et al.

(10) Patent No.: US 9,918,065 B2
(45) Date of Patent: *Mar. 13, 2018

(54) DEPTH-ASSISTED FOCUS IN MULTI-CAMERA SYSTEMS

(71) Applicant: Google LLC, Mountain View, CA (US)

(72) Inventors: Ryan Geiss, San Jose, CA (US); Roman Lewkow, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,016

(22) Filed: Dec. 23, 2016

(65) Prior Publication Data

US 2017/0111630 A1    Apr. 20, 2017

Related U.S. Application Data

(63) Continuation of application No. 14/167,950, filed on Jan. 29, 2014, now Pat. No. 9,565,416.

(51) Int. Cl.
*H04N 13/02* (2006.01)
*H04N 13/00* (2018.01)
(Continued)

(52) U.S. Cl.
CPC ....... *H04N 13/0022* (2013.01); *H04N 5/2258* (2013.01); *H04N 5/235* (2013.01);
(Continued)

(58) Field of Classification Search
CPC ........... H04N 13/0022; H04N 13/0207; H04N 5/23212
See application file for complete search history.

(56) References Cited

U.S. PATENT DOCUMENTS 5,978,015 A   11/1999   Ishibashi et al.
7,190,389 B1   3/2007   Abe et al.
(Continued)

FOREIGN PATENT DOCUMENTS

JP    08-116553        5/1996
JP    11-272855 A     10/1999
(Continued)

OTHER PUBLICATIONS

International Search Report and Written opinion dated Mar. 6, 2015 in International Application No. PCT/US2014/068504, 14 pages.
(Continued)

*Primary Examiner* — Christopher Findley
(74) *Attorney, Agent, or Firm* — McDonnell Boehnen Hulbert & Berghoff LLP

(57) ABSTRACT

Example embodiments may help multi-camera devices determine disparity information scene, and use the disparity information in an autofocus process. An example method involves: (a) receiving image data of a scene that comprises at least one image of the scene captured by each of two or more image-capture systems of a computing device that includes a plurality of image-capture systems; (b) using the image data captured by the two or more image-capture systems as a basis for determining disparity information for the scene; and (c) performing, by the computing system, an autofocus process based at least in part on the disparity information, wherein the autofocus process provides a focus setting for at least one of the image-capture systems of the computing device.

18 Claims, 14 Drawing Sheets

(51) Int. Cl.
*H04N 5/225* (2006.01)
*H04N 5/232* (2006.01)
*H04N 5/235* (2006.01)

(52) U.S. Cl.
CPC ..... *H04N 5/23212* (2013.01); *H04N 13/0207* (2013.01); *H04N 13/0239* (2013.01); *H04N 13/0242* (2013.01); *H04N 13/0296* (2013.01)

(56) References Cited

U.S. PATENT DOCUMENTS

| | | | |
|---|---|---|---|
| 7,957,581 | B2 | 6/2011 | Wu |
| 7,986,343 | B2 | 7/2011 | Kumagai et al. |
| 8,134,589 | B2 | 3/2012 | Border et al. |
| 8,260,040 | B2 | 9/2012 | Woodfill et al. |
| 8,294,711 | B2 | 10/2012 | Yahagi |
| 8,553,106 | B2 | 10/2013 | Scarff |
| 8,941,721 | B2 | 1/2015 | Kim et al. |
| 9,565,416 | B1 * | 2/2017 | Lewkow ............ H04N 13/0022 |
| 2002/0030675 | A1 | 3/2002 | Kawai |
| 2003/0117511 | A1 | 6/2003 | Belz et al. |
| 2005/0129324 | A1 | 6/2005 | Lemke |
| 2007/0132874 | A1 | 6/2007 | Forman et al. |
| 2007/0159535 | A1 | 7/2007 | Kumagai et al. |
| 2008/0024614 | A1 | 1/2008 | Li et al. |
| 2008/0030592 | A1 | 2/2008 | Border et al. |
| 2008/0049100 | A1 | 2/2008 | Lipton et al. |
| 2008/0218611 | A1 | 9/2008 | Parulski et al. |
| 2009/0059033 | A1 | 3/2009 | Shimada et al. |
| 2010/0092107 | A1 | 4/2010 | Mochizuki et al. |
| 2010/0134652 | A1 | 6/2010 | Takane |
| 2011/0010626 | A1 | 1/2011 | Fino et al. |
| 2011/0122308 | A1 | 5/2011 | Duparre |
| 2011/0255786 | A1 | 10/2011 | Hunter |
| 2011/0311130 | A1 | 12/2011 | Ichimori |
| 2012/0002082 | A1 | 1/2012 | Johnson et al. |
| 2012/0056982 | A1 | 3/2012 | Katz et al. |
| 2012/0075489 | A1 | 3/2012 | Nishihara |
| 2012/0105672 | A1 | 5/2012 | Doepke et al. |
| 2012/0262572 | A1 | 10/2012 | Cudak et al. |
| 2012/0287310 | A1 | 11/2012 | Fujii et al. |
| 2012/0327195 | A1 | 12/2012 | Cheng |
| 2013/0011045 | A1 | 1/2013 | Lee et al. |
| 2013/0027606 | A1 | 1/2013 | Voss et al. |
| 2013/0057655 | A1 * | 3/2013 | Su ............................ G02B 7/30 348/47 |
| 2013/0076649 | A1 | 3/2013 | Myers et al. |
| 2013/0076866 | A1 | 3/2013 | Drinkard et al. |
| 2013/0106850 | A1 | 5/2013 | Endo |
| 2013/0147923 | A1 | 6/2013 | Zhou et al. |
| 2013/0201391 | A1 | 8/2013 | Ogasahara et al. |
| 2013/0250053 | A1 | 9/2013 | Levy |
| 2013/0335301 | A1 | 12/2013 | Wong et al. |
| 2014/0043445 | A1 | 2/2014 | Zhang |
| 2014/0160245 | A1 * | 6/2014 | Cheng ................ H04N 13/0239 348/47 |
| 2014/0337791 | A1 | 11/2014 | Agnetta et al. |
| 2014/0347439 | A1 | 11/2014 | Jia et al. |
| 2015/0092023 | A1 * | 4/2015 | Asakura ............ H04N 13/0217 348/49 |

FOREIGN PATENT DOCUMENTS

| | | |
|---|---|---|
| JP | 2001-022014 | 1/2001 |
| JP | 2007-305050 A | 11/2007 |
| JP | 2010-081010 | 4/2010 |
| KR | 10-2010-0013700 A | 2/2010 |
| KR | 101225482 B1 | 1/2013 |
| WO | 2010147609 | 12/2010 |
| WO | 2012042704 | 5/2012 |
| WO | WO2014021134 * | 2/2014 |

OTHER PUBLICATIONS

International Search Report and Written opinion dated Feb. 25, 2015 in International Application No. PCT/US2014/068520, 9 pages.

Low, Aloysius, CNET article titled "Corephotonics' dual-camera tech will change smartphone imaging," dated Feb. 27, 2014.

* cited by examiner

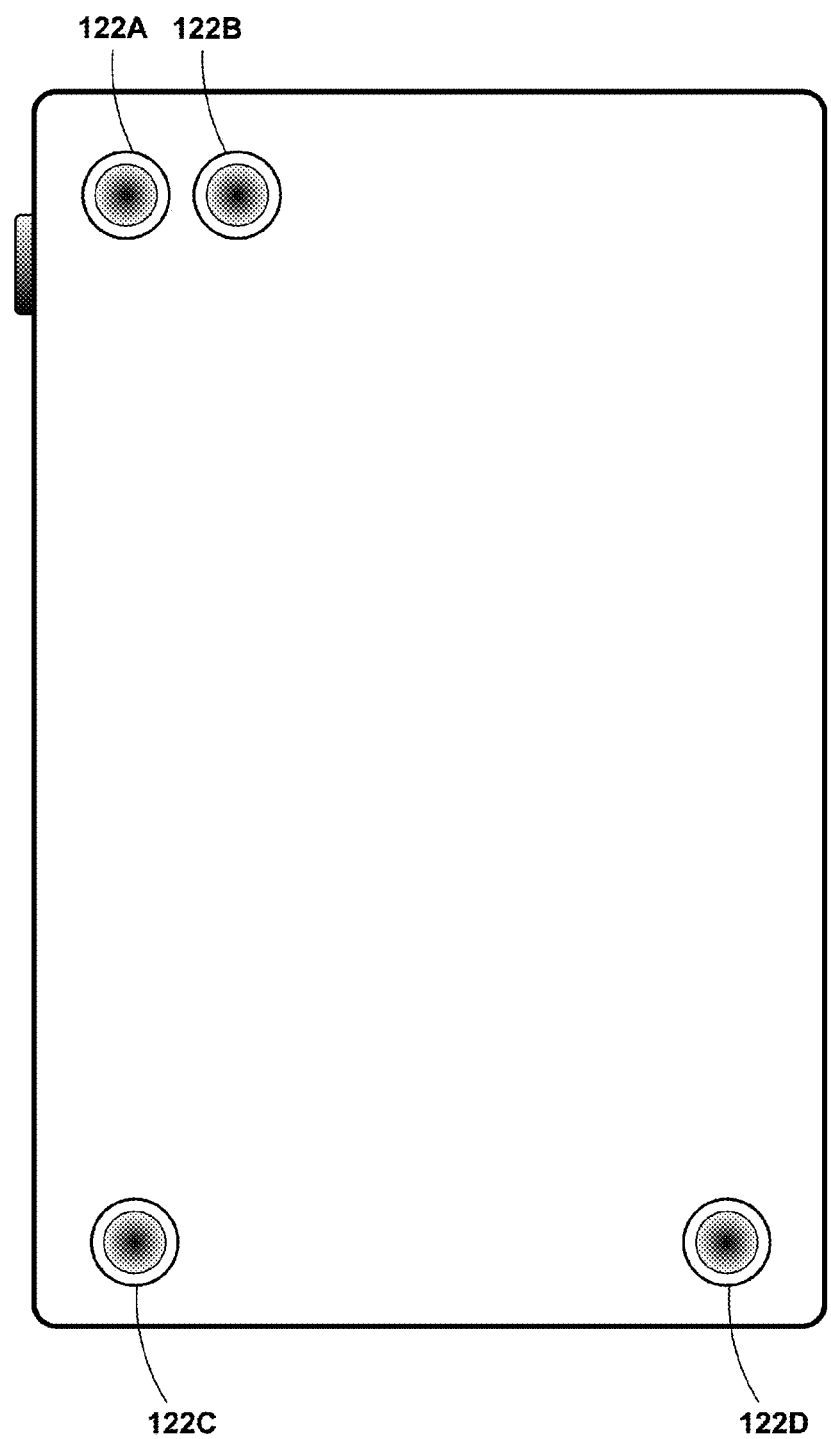

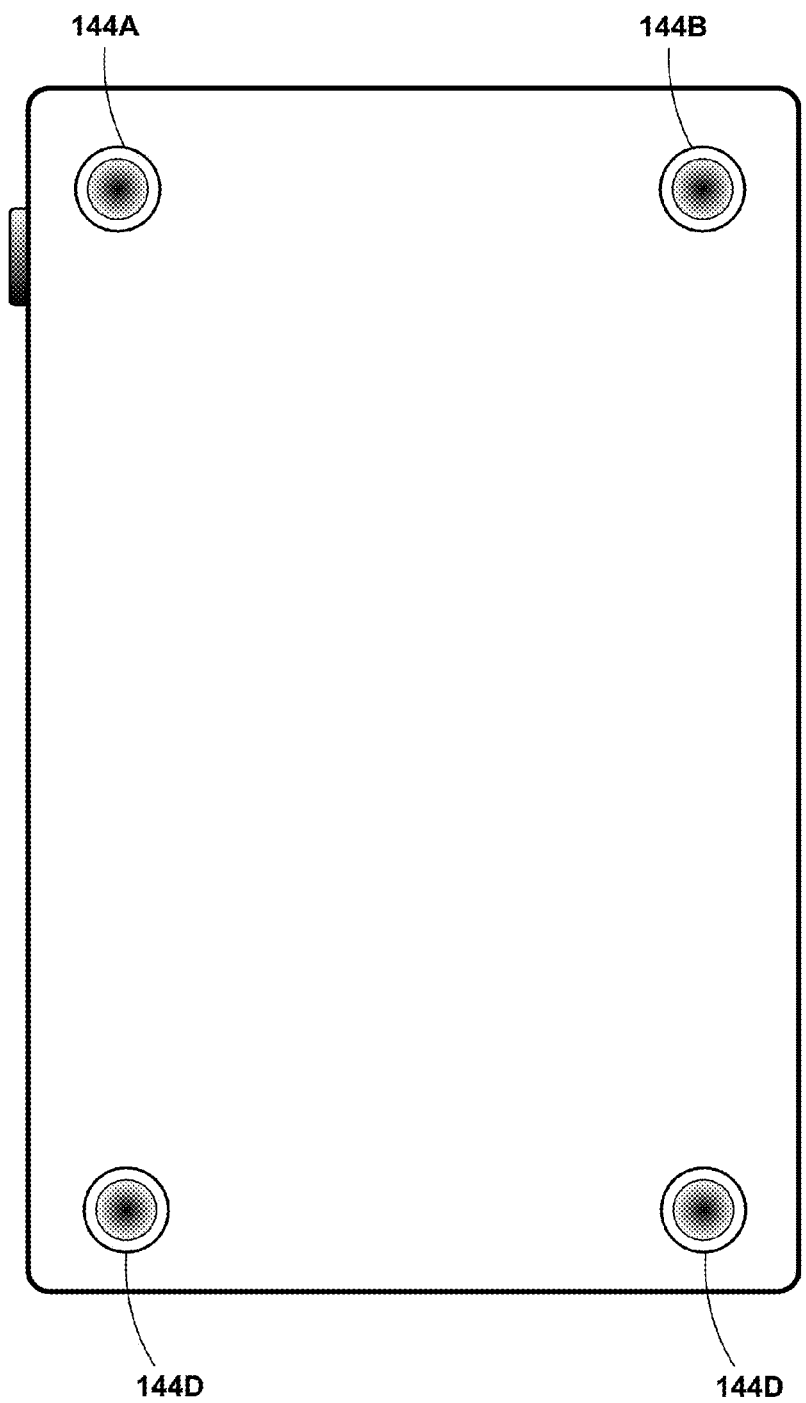

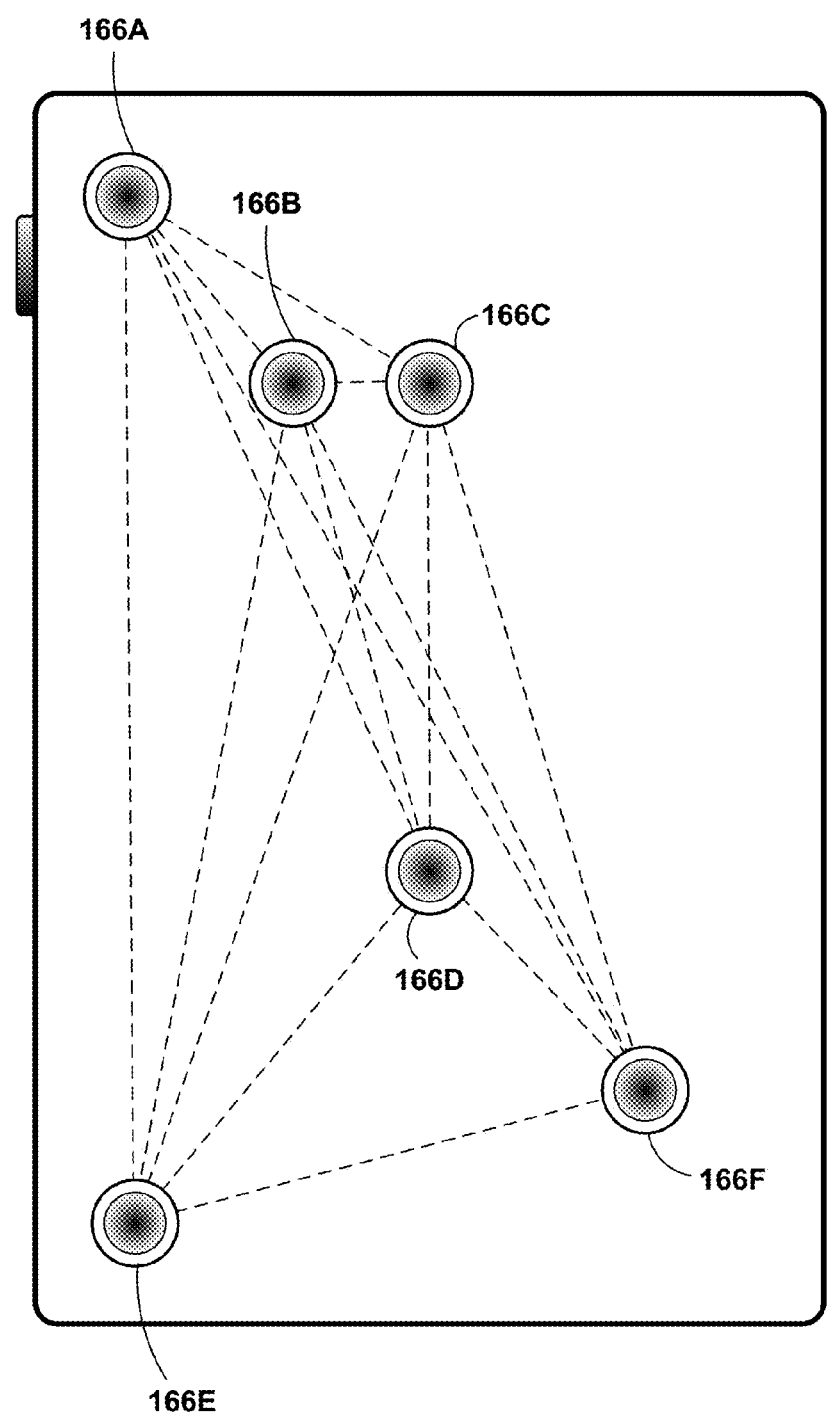

DEPTH-ASSISTED FOCUS IN MULTI-CAMERA SYSTEMS

CROSS-REFERENCE TO RELATED APPLICATION

This application is a continuation of U.S. patent application Ser. No. 14/167,950, filed on Jan. 29, 2014, which is incorporated herein by reference in its entirety and for all purposes.

BACKGROUND

Generally, imaging may refer to capturing and representing the color and brightness characteristics of a real-world environment in a digital format and/or a film format (e.g., in photographs and/or motion video). A large variety of image capture devices exist, thus providing consumers with numerous ways to capturing image data.

As image capture devices, such as cameras, become more popular, such devices may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

SUMMARY

Example embodiments may help to improve autofocus (AF) processes in a device that includes multiple cameras that are oriented in the same direction. In particular, such a device may operate two or more of its cameras to capture two or more images of a scene from different perspectives (e.g., perspectives that are offset from one another by the distances between the cameras' lenses). Disparity and/or depth information for the scene may then be determined by analyzing the images of the scene. The disparity and/or depth information may then be used to improve an autofocus process; e.g., by setting a position of one of the camera's lens such that the distance to an object or objects in the scene is within the depth-of-field of the lens, or in other words, such that the object or objects are in focus.

In a first aspect, a method involves a computing system: (a) receiving image data of a scene, wherein the image data comprises image data captured by each of two or more image-capture systems of a computing device that includes a plurality of image-capture systems; (b) using the image data captured by the two or more image-capture systems as a basis for determining disparity information for the scene; and (c) performing an autofocus process based at least in part on the disparity information, wherein the autofocus process provides a focus setting for at least one of the image-capture systems of the computing device. Note that the computing system that performs an example method or portions thereof may be part of the computing device that includes the image-capture systems, or may be a remote computing system (e.g., a cloud server) in communication with the device that includes the image-capture systems.

In a further aspect, a system includes a plurality of image-capture systems that are oriented in substantially the same direction and a control system. The control system is configured to: (a) receive image data of a scene, wherein the image data comprises image data captured by each of two or more of the image-capture systems; (b) use the image data captured by the two or more image-capture systems as a basis for determining disparity information for the scene; and (c) perform an autofocus process based at least in part on the disparity information for the scene, wherein the autofocus process provides a focus setting for at least one of the image-capture systems.

In another aspect, a non-transitory computer readable medium has stored therein instructions executable by a computing device to cause the computing device to perform functions comprising: (a) receiving image data of a scene, wherein the image data comprises at least one image of a scene captured by each of two or more image-capture systems of a computing device that includes a plurality of image-capture systems; (b) using the image data captured by the two or more image-capture systems as a basis for determining disparity information for the scene; and (c) performing an autofocus process based at least in part on the disparity information for the scene, wherein the autofocus process provides a focus setting for at least one of the image-capture systems of the computing device.

In yet another aspect, a system may include: (a) means for receiving image data of a scene, wherein the image data comprises at least one image of a scene captured by each of two or more image-capture systems of a computing device that includes a plurality of image-capture systems; (b) means for using the image data captured by the two or more image-capture systems as a basis for determining disparity information for the scene; and (c) means for performing an autofocus process based at least in part on the disparity information for the scene, wherein the autofocus process provides a focus setting for at least one of the image-capture systems of the computing device These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1B shows a digital camera device with an arrangement of four cameras oriented in the same direction, in accordance with an example embodiment.

FIG. 1C shows another digital camera device with an arrangement of four cameras oriented in the same direction, in accordance with an example embodiment.

FIG. 1D shows a digital camera device with an arrangement of six cameras oriented in the same direction, in accordance with an example embodiment.

DETAILED DESCRIPTION

Figure 1A:
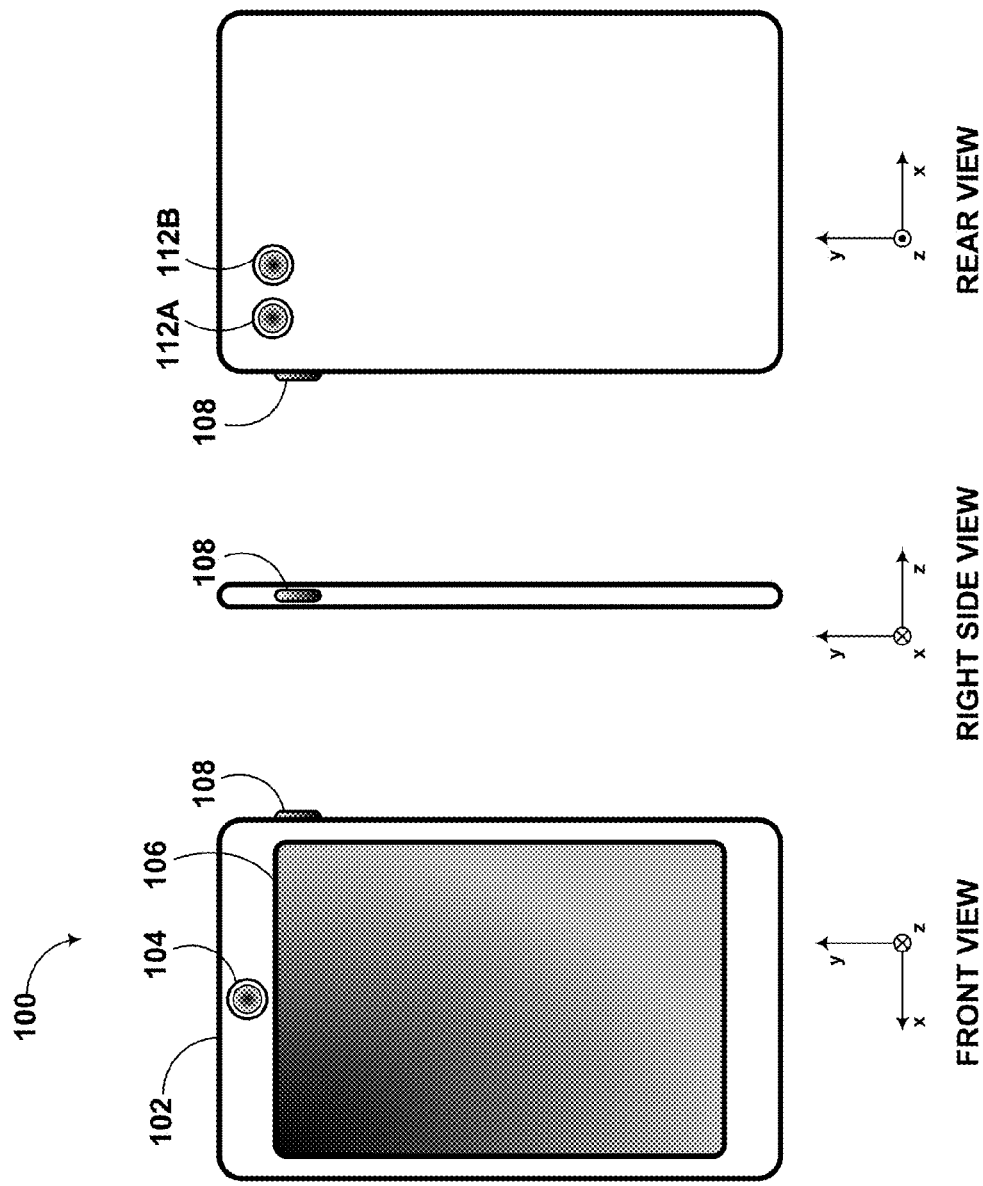
FIG. 1A depicts front, right side, and rear views of a digital camera device, in accordance with an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations, all of which are contemplated herein.

I. Overview

Auto-focus (AF) is the process of automatically finding an appropriate focus position for an imaging system to capture an image of a scene. The process of determining which part of a scene to focus on, and then determining the focus settings to do so, may be challenging to implement, especially in complex scenes with significant motion. In mobile imaging systems, such as those that are implemented in many of today's mobile phones, there may be significant size constraints, power-budget constraints, and/or cost restrictions. These factors can make the implementation of auto-focus system on such mobile devices even more challenging than it otherwise would be.

In particular, more-advanced AF systems, such as those utilizing a separate, dedicated sensor for phase-detection AF processes, may be impractical on size-constrained devices such as mobile phones. As such, most mobile phones rely on contrast-detection AF techniques, which utilize the imaging systems primary image sensor. Contrast-detection AF is typically slower than other more-advanced techniques, as it requires a "blind" search of most of the focusing range (e.g., "focus hunting"). During a video recording, such focus hunting may produce unwanted artifacts in the recorded video (e.g., portions that repeatedly go in and out of focus).

Further, the delay that can result from contrast-detection AF may be undesirable in taking still pictures, as it can directly affect shutter delay. More specifically, shutter delay is the time between the moment the user commands the picture taking (e.g., by pressing a shutter button), and the moment when the picture is actually captured. Shutter delay is typically longer on mobile devices than other image-capture devices such as DSLRs, and thus may be considered one of the more constraining aspects of mobile imaging (as compared to, e.g., using a DSLR).

An example embodiment may involve a device, such as a mobile phone, using multiple cameras to capture images of a scene, generating depth information about the scene, and then using the depth information to enhance an AF process. In particular, a device may determine the disparity between simultaneously captured images of a scene. The device may then use the disparity as depth information, which improves understanding of the scene structure, and thus may help to improve the speed and the quality of the results achieved by an AF process.

Example embodiments may be implemented in association with or take the form of a device with multiple cameras having their fields of view oriented in the same direction, which are separated by some distance and can therefore capture different perspectives of the same scene. For instance, example embodiments may be implemented in association with or take the form of a mobile phone with multiple forward- and/or rear-facing cameras.

Image data from such a multi-camera arrangement may be used to obtain depth information for a scene (and possibly for specific objects and/or areas within a scene). The depth information may be used to help in an autofocus process. For example, once the distance to an object is known, the focus setting of a camera can be set such that the object is in focus.

In some embodiments, the depth information may include or take the form of disparity information. Disparity information may include data that indicates the disparity between two or more images of the same scene that are captured from two or more different perspectives (e.g., by two or more cameras on a multi-camera device).

In a further aspect of some embodiments, image data from a multi-camera arrangement may be used to generate a depth map (or distance map) of a scene, which provides information regarding the distance(s) from the imaging device to object(s) in the scene. Once the distance to an object is known, the focus setting of a camera can be set such that the object is in focus. In such an embodiment, the depth map may be utilized to improve the AF capabilities of one or more of the device's cameras. In particular, by utilizing the distance information for various elements in a scene, an AF process may be made more intelligent by, e.g., better recognizing the structure of the scene. Further, an AF process may achieve focus more quickly by, e.g., driving the focusing mechanism to the correct position, (i.e., the correct focus setting) without extensive focus hunting. Yet further, by segmenting a scene and providing information about the scene's structure and elements, a depth map may allow for more intelligent decisions as to which element(s) of a scene are important and should be focused on.

Note that herein, a "camera system" or "image-capture system" may refer to an image-capture device or a camera, a system within a camera, a separate system that is communicatively coupled to a camera, or a combination of a camera and one or more other systems. Further, for sake of simplicity, examples described herein may attribute certain functions and/or characteristics to a "camera" or "camera device." It should be understood that, in many cases, functions and/or characteristics that are attributed to a camera or camera device may likewise be attributed to a camera system, even when this is not stated explicitly.

II. Illustrative Systems

The physical components of an image capture device may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

A. Devices with Multiple Image-Capture Systems

As noted previously, digital cameras may be standalone devices or integrated with other devices. As an example, FIG. 1A illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and possibly other buttons or interface features. Front-facing camera 104 may be positioned on a side of body 102 typically facing a user while in operation, or on the same side as multi-element display 106.

Digital camera device 100 could further include two rear-facing cameras 112A and 112B. Rear-facing cameras 112A and 112B may be positioned on a side of body 102 opposite front-facing camera 104. Note that referring to the cameras as front and rear facing is arbitrary, and digital camera device 100 may include multiple cameras positioned on various sides of body 102. Further, the lenses of rear-facing cameras 112A and 112B are arranged on the upper corner on the back of digital camera device 100, and are oriented in substantially the same direction. (Note that herein, references to cameras being oriented in the same direction should be understood to mean that the lenses of the cameras point in substantially the same direction.)

It should be understood that other multi-camera arrangements are possible. In particular, the lenses of two or more cameras, which are all oriented in substantially the same direction, may be arranged in different formations on a surface of the phone. For instance, several other multi-camera arrangements are described herein with respect to FIGS. 1B to 1E.

In particular, FIG. 1B shows a mobile device 120 with an arrangement of four cameras 122A to 122D oriented in the same direction, including two cameras 122A and 122B in the upper corner of the mobile device (similar to FIG. 1A), and two additional cameras 122C and 122D that are located at the lower corners of the mobile device 120. Further, FIG. 1C shows another arrangement with four cameras oriented in the same direction. In particular, the arrangement in FIG. 1C includes one camera 144A to 144D in each corner of the device 140.

Yet further, FIG. 1D shows an arrangement with six cameras 166A to 166F facing in the same direction. In FIG. 1D, the six cameras 166A to 166F are placed on the back of the mobile device 160 in less-structured, "organic," arrangement. Note that an arrangement with three or more cameras may provide multiple baselines between different pairs of cameras. For instance, a six-camera arrangement such as that shown in FIG. 1D may provide up to 15 different baselines for, e.g., stereoscopic imaging. More generally, an arrangement of n cameras that are oriented in substantially the same direction may provide up to C(n, k) combinations of baselines.

Figure 1E:
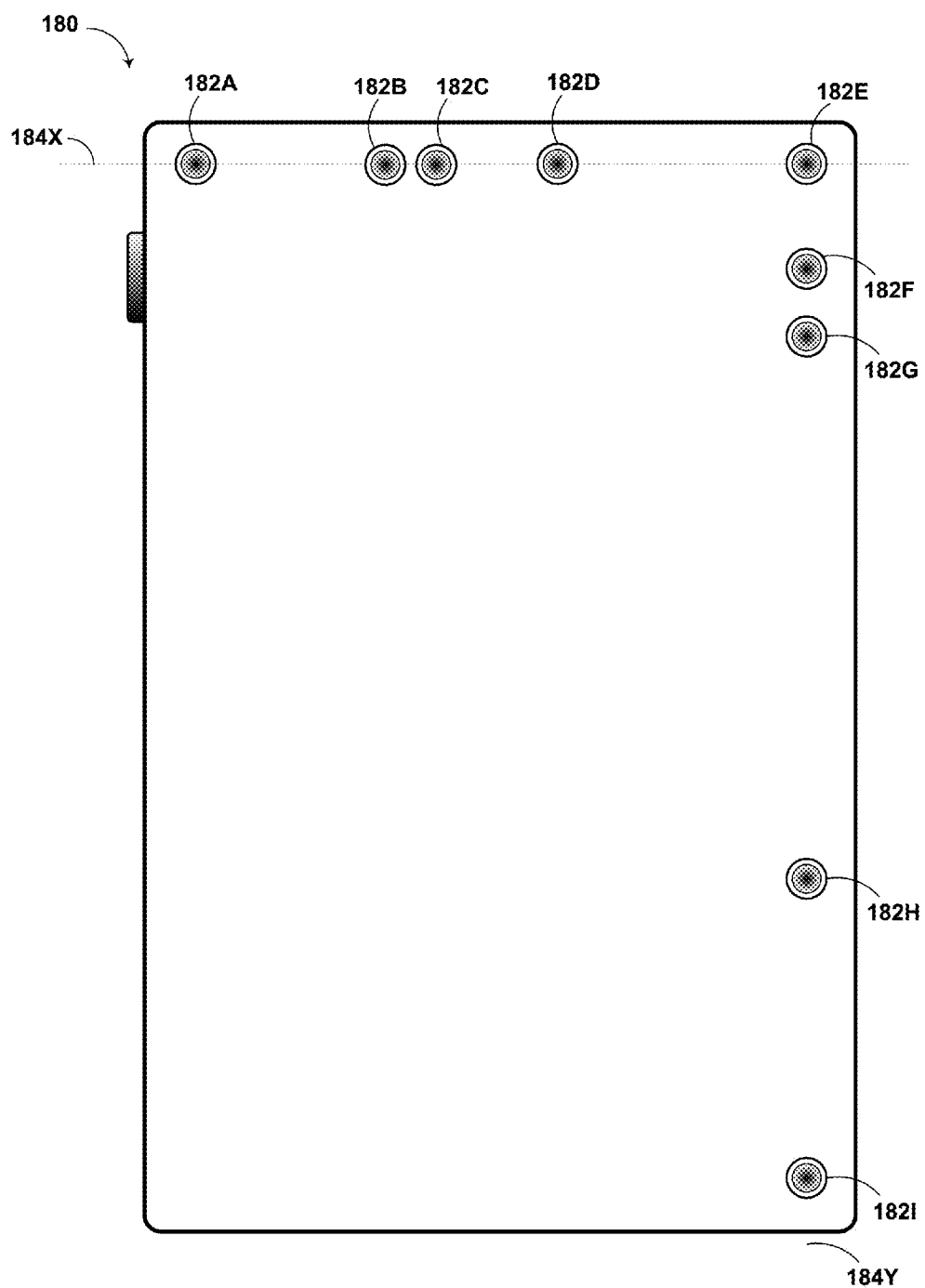
FIG. 1E shows another digital camera device with a multi-camera arrangement, in accordance with an example embodiment.

In another variation, FIG. 1E shows an arrangement with nine cameras 182A to 182I facing in the same direction. In FIG. 1E, the nine cameras 182A to 182F are placed on the back of the mobile device 180 along two axes 184X and 184Y. Accordingly, different pairs of cameras may be selected from cameras 182A to 182F to provide a number of different baselines along the two axes 184X and 184Y, as well as a number of different off-axis baselines.

It is contemplated that other multi-camera arrangements may include more or fewer cameras than those shown in FIGS. 1A to 1E. In addition, the lenses in a multi-camera arrangement may be oriented at a different angle with respect to the surface on which the lenses are arranged. Yet further, it should be understood that multi-camera arrangements may be implemented on other sides of a digital camera device. Other variations on the multi-camera arrangements shown in the figures are also possible.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or one or both of rear-facing cameras 112A and 112B, or an image that could be captured or was recently captured by any one of or any combination of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing cameras 112A and 112B may be similarly or differently arranged. Additionally, front-facing camera 104, each rear-facing camera 112A and 112B, or any combination of these cameras, may in fact be an array of one or more cameras (or an array of lenses that direct light onto a common image sensor).

Any one or any combination of front facing camera 104 and rear-facing cameras 112A and 112B may include or be associated with an illumination component that provides an illumination source to illuminate a target object. For instance, an illumination component could provide flash or constant illumination of the target object. An illumination component could also be configured to provide an illumination field that includes one or more of structured light, polarized light, and light with specific spectral content. Other types of illumination sources known and used to recover three-dimensional (3D) models from an object are possible within the context of the embodiments herein.

Any one or any combination of front facing camera 104 and rear-facing cameras 112A and 112B may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure setting of an associated camera, or to help in this determination.

Digital camera device 100 could be configured to use multi-element display 106 and either front-facing camera 104 or one or both of rear-facing cameras 112A and 112B to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

B. Illustrative Device Components

Figure 2:
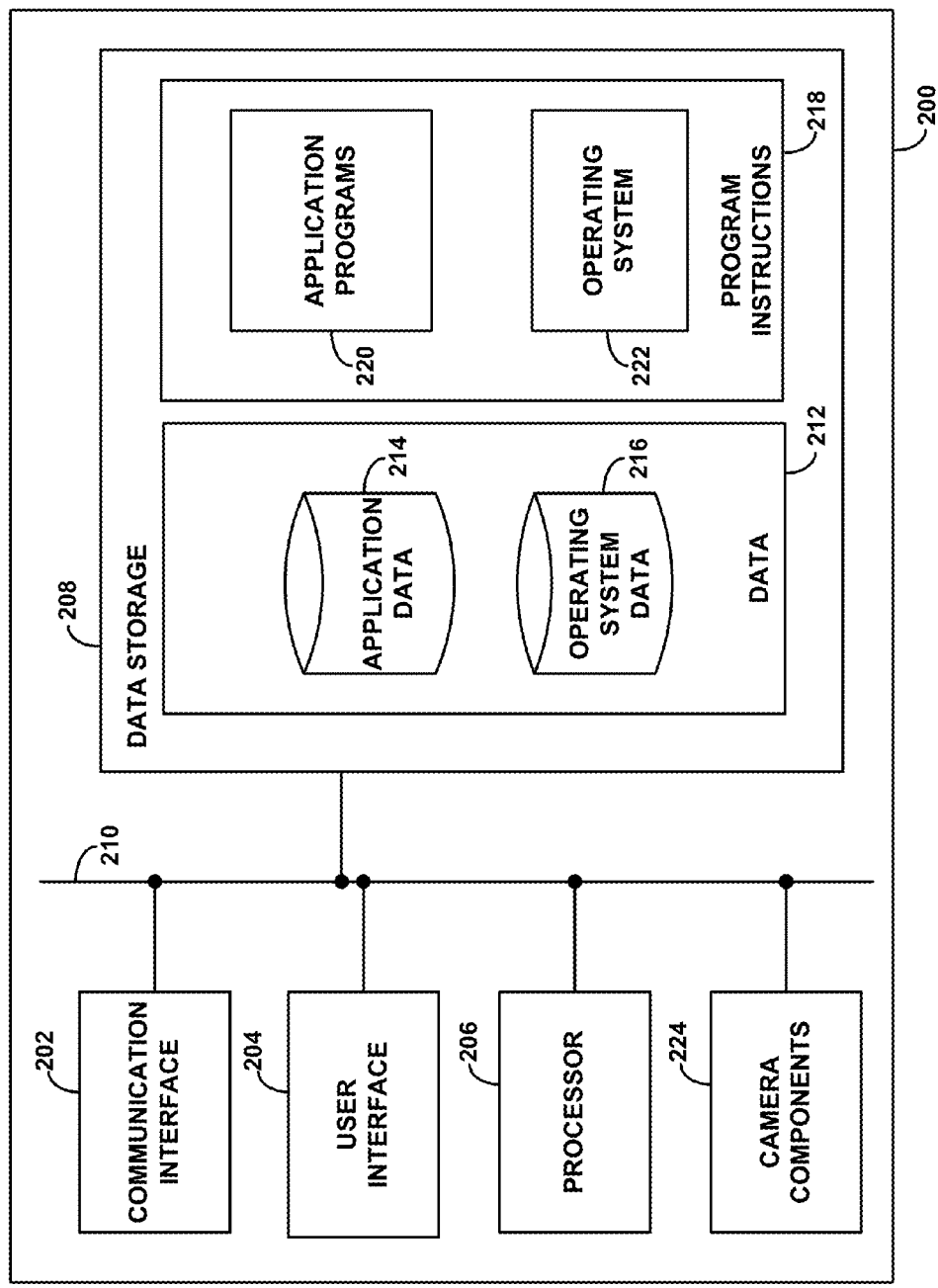
FIG. 2 is a simplified block diagram showing some of the components of an example computing device that may include camera components.

As noted above, the functions of digital camera device 100—or another type of digital camera—may be integrated into or take the form of a computing device, such as a mobile phone, tablet computer, laptop computer and so on. For purposes of example, FIG. 2 is a simplified block diagram showing some of the components of an example computing device 200 that may include camera components 224. Camera components 224 may include multiple cameras, such as cameras 112A and 112B.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a touch- or proximity-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206. Further, camera components 224 may include multiple camera systems, which each include an aperture, shutter, recording surface lens, image sensor, processor, and/or shutter button.

When multiple camera systems are included, there may be some components that are shared between the systems, and other components that are not shared. For example, each camera could include its own aperture, lens, and image sensor, while sharing other components such as a processor and a shutter button. As another example, each camera could include its own lens, but share the same image sensor. Alternatively, each camera system's components may be utilized only for that camera system, and not shared with other camera systems.

C. Digital Images

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different number of bits for pixel value representation (e.g., 10, 12, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

E. Autofocus

Generally, an autofocus (AF) system may include a sensor of some kind, a control system that automatically determines focus settings, and an actuator to adjust the mechanical components of the camera (e.g., the lens) according to the focus settings. The data provided by the sensor may be used to evaluate the manner in which the environment is or will be recorded by an image sensor, and to control an electro-mechanical system that can change the focus setting of a camera (e.g., by using an actuator to move components of the lens). Various types of autofocus techniques may be utilized by an image capture device, such as digital camera device 100.

Many consumer cameras include passive autofocus systems, which focus the lens on a subject by passively analyzing the image that is entering the optical system (e.g., they do not direct controlled beams of light on the subject in order to focus). Typical passive autofocus techniques include "phase detection" autofocus (PD-AF) and "contrast detection" autofocus (CD-AF), which may also be referred to as "contrast measurement" autofocus.

Passive autofocus processes typically involves a computing system (e.g., a processor) operating a mechanical lens system to adjust the focus setting(s) of the lens (e.g., to change the distance between a focusing element of the lens and the sensor), and then analyzing whether or not the resulting image from an autofocus sensor is in focus. If the resulting image is not satisfactorily in focus, then the computing system again adjusts the focus settings and evaluates the characteristics in the resulting image. In some implementations, each adjustment to the focus settings may be determined based on some measure of how out of focus the image is (or how out of focus a particular portion of the image is). In other implementations, the adjustments may be predetermined. In either case, this process may be repeated until the resulting image is deemed to be satisfactorily in focus.

As noted above, some cameras, such as DSLRs, may include dedicated autofocus systems, which may include one or more sensors that are dedicated to autofocus. Such cameras typically do not use the image sensor, which is used to capture images, for purposes of autofocus. Further, such cameras typically include PD-AF system, in which light received through the lens is split into a pair of images. Both of the images in the pair may then be directed onto the autofocus sensor and analyzed to determine whether or not the lens is in focus. The focus setting of the lens may then be adjusted until proper focus is detected.

One common system PD-AF system is a through-the-lens, second-image registration, phase detection (SIR PD-AF) system. An SIR PD-AF system utilizes a beam splitter to direct incoming light towards an autofocus sensor. More specifically, micro-lenses that are located on opposite sides of the lens may direct light from coming from the opposite sides of the lens towards the autofocus sensor, which effectively creates a rangefinder, with two images being projected onto the autofocus sensor. The images formed by the two micro-lenses are then compared to determine a separation error, which is evaluated to determine whether the lens is focused correctly. If the separation error indicates that the subject is out of focus (e.g., if the separate error is not zero or within some threshold from zero), then an adjustment to the focus settings may be calculated based on the separation error, and one or more lens elements may be moved according to the adjusted settings (e.g., by moving the lens assembly or a lens element closer to or further from the sensor).

When size and/or cost of components are significant in the design of a device, the device may utilize a camera system that does not include a separate autofocus system. Such is the case with many mobile phones and/or tablet computers, which often include camera systems that use the same image sensor for both autofocus and image capture. In many cases, cameras in portable devices such as mobile phones and tablets use CD-AF for purposes of focusing.

While CD-AF systems can use a separate sensor that is dedicated to autofocus, most CD-AF systems use the same image sensor for both image capture and autofocus. CD-AF systems determine whether or not a subject is in focus by measuring the contrast in the image that is detected on the sensor. To do so, a CD-AF system may evaluate the change in contrast at various points in the image, with higher contrast being interpreted as an indication of a sharper image.

More specifically, the difference in intensity between adjacent pixels of a sensor is generally greater when the subject captured in the adjacent pixels is in focus, as compared to when image subject is out of focus. Further, a CD-AF system may measure the contrast at specific pixels, or determine the average over certain groups of pixels. In either case, a CD-AF system may then adjust focus settings until a threshold contrast is detected (and possibly until a maximum contrast is detected). For example, an illustrative CD-AF system may pass image data through a high pass filter, and adjusts the focus of the lens until the output from the filter exceeds a threshold (and possibly until the output of the filter is at its highest level).

Further, the focus setting for a scene may be defined as or otherwise indicate the distance between the focusing element of the lens and the sensor (e.g., the focus position) that results in proper focus. Further, the focus position is typically proportional to (or at least a function of) the distance between the lens and the subject or area of the scene that is being focused on. Note that herein, the distance between the lens and a particular subject or object may be referred to herein as the "object distance." As such, a computing system on a device may determine the object distance based on the focus setting or position.

In an illustrative embodiment, a multi-camera device, such those shown in FIGS. 1A to 1E, may use two or more of its cameras having fields of view in substantially the same direction, to determine disparity and/or depth information for a scene. The multi-camera device may then use the disparity and/or depth information to help enhance an AF process for at least one of its cameras.

III. Illustrative Methods

Figure 3A:
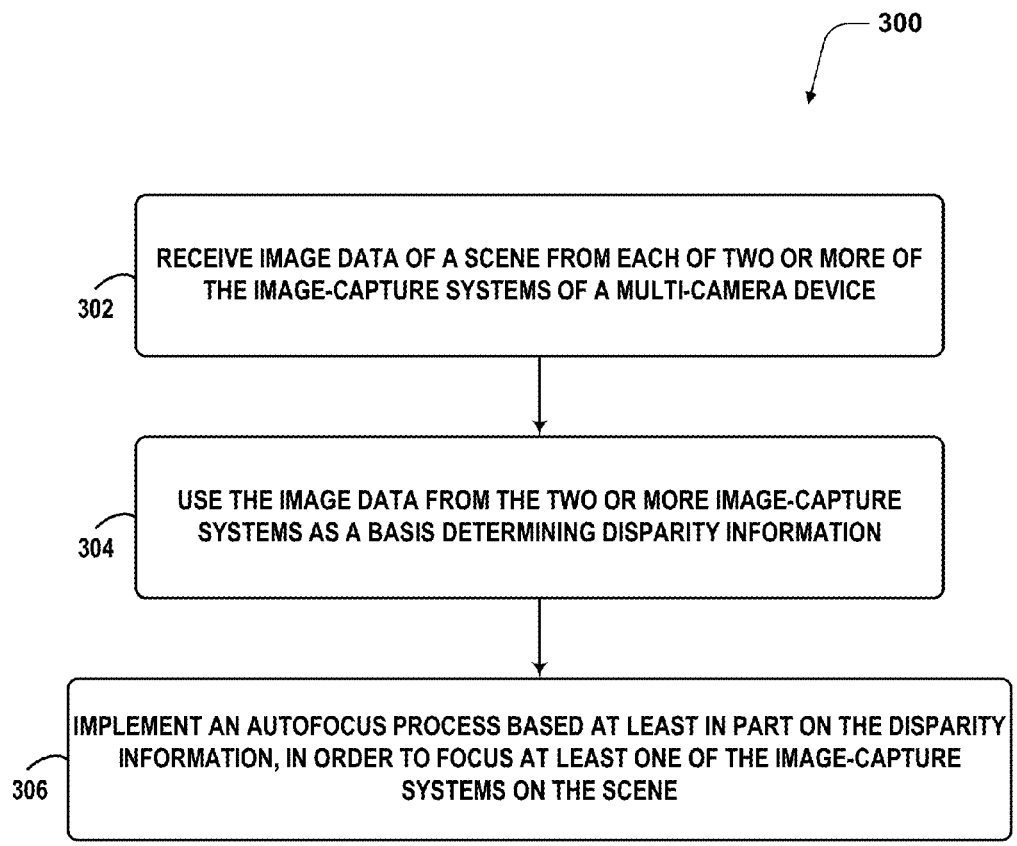
FIGS. 3A and 3B are flow charts illustrating methods, in accordance with example embodiments.

FIG. 3A is a flow chart illustrating a method 300, according to an example embodiment. Method 300 may be implemented by a device that includes two or more cameras oriented in the same direction, where each camera is separated from the other cameras by some distance, such as the devices shown in FIGS. 3A to 3E. Alternatively, method 300 may be implemented by a device or system that is separate from and configured to communicate with such a multi-camera device. In either case, method 300 may be implemented to enhance an AF process with disparity information that is obtained by using two or more cameras of a multi-camera device to capture images of a scene from different perspectives.

As shown by block 302, method 300 involves a computing system of a multi-camera device receiving image data of a scene from each of two or more image-capture systems (e.g., two separate cameras on a multi-camera device), which are oriented in substantially the same direction and have fields of view that substantially overlap. The computing system then uses the image data from both of the two or more image-capture systems as a basis for determining disparity information, as shown by block 304. The computing system may then implement an AF process based at least in part on the disparity information, in order to focus at least one of the image-capture systems on the scene, as shown by block 306.

At block 302, the number of image-capture systems that are utilized may vary, depending upon the particular implementation. In some embodiments, three or more of a device's image-capture systems may be used to capture images of a scene. In other embodiments, two image-capture systems may be used to capture a stereo image data of a scene (i.e., a pair of images, including one image captured by each camera). Other configurations of image-capture systems are also possible.

At block 304, various techniques may be used to determine disparity information for a scene. For instance, various known "depth-from-stereo" techniques may be used to determine disparity and/or extract depth information from two or more images of a scene, which are captured by cameras that are oriented in substantially the same direction and offset from one another (such that the fields of view of the cameras overlap). Such techniques may utilize spatial optical flow between two or more images of a scene to determine disparity information for the scene. Techniques that utilize feature matching to determine the disparity between two or more images of a scene may also be utilized. Other techniques are also possible In an example embodiment, a computing system may determine correspondence data that indicates the correspondence between first image of the scene captured by a first image-capture system and second image of the scene captured by a second image-capture system. To do so the computing system may determine a spatial optical flow between the first image and second image of the scene. The spatial optical flow may then be used to determine the correspondence between the first and second images. In other embodiments, the computing system may use other techniques to determine the correspondence between two images of a scene. In any such case, the computing system may use the correspondence data to determine the disparity between a portion or all of the image data of the scene captured by the first of the two or more image-capture systems and a corresponding portion or all of the image data of the scene captured by the second of the two or more image-capture systems.

In some embodiments, disparity information may be determined from two images of a scene (e.g., from a stereo image pair). In other embodiments, the disparity information may be determined from three or more images of a scene, which are each captured from a different perspective.

If only two image-capture systems are used to capture image data of a scene, then the disparity information determined at block 304 may include the disparity due to parallax in the stereo image pair. If three or more of a device's image-capture systems are used to capture images of a scene, then block 304 may involve determining the disparity due to parallax in two or more stereo image pairs (e.g., captured by different pairs of the device's image-capture systems). Further, when two or more image pairs of a scene are captured using camera pairs with different baselines, block 304 may further involve determining the variation in disparity between the different stereo image pairs, which are captured using different baselines. Several more-detailed examples of techniques for determining disparity information are described in sections V and VI below.

In a further aspect, the disparity information itself may take various forms, depending upon the technique used to determine the disparity information. In some embodiments, the disparity information may be determined for the scene as whole. For example, the computing system may determine the average disparity across the entire scene. In some cases, the disparity for a scene may be based on a weighted average, where a certain or areas of the scene are given greater weight, such as an area in the scene that aligns with a focus point.

In other embodiments, the disparity information for a scene may be determined in a more granular manner, such as by determining the respective disparity in multiple segments of the scene. For example, at block 304, the computing system may divide image data of the scene into segments (e.g., by segmenting the image frame in each of two or more images of the scene), and may then determine the local disparity in one or more of the individual segments. To do so, the computing system may determine the disparity between a segment in a first image of the scene and the corresponding segment in a second image of the scene (e.g., the segment in the second image that is at the same location in the image frame as the segment of the first image). The computing system may then repeat this process to determine the disparity for one or more additional segments, and possibly all segments, of the image frame.

Figure 3B:
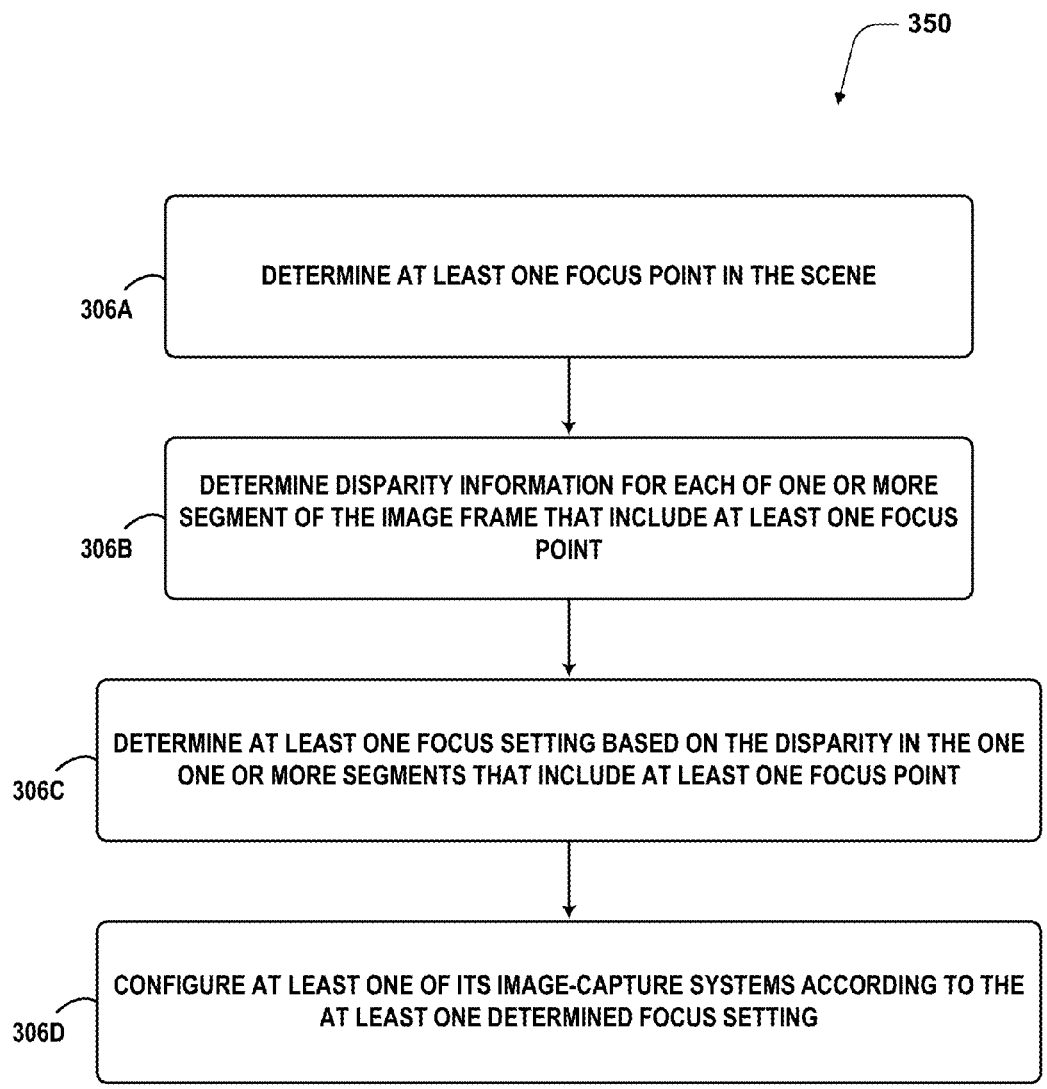

At block 306, disparity information may be incorporated in various types of AF processes. For instance, FIG. 3B is a flow chart illustrating an AF method 350, which can be implemented at block 306, according to an example embodiment. Method 350 involves the computing system determining one or more focus points in the scene, as shown by block 306a. A given focus point may take the form of the (x, y) coordinates in the image frame that are given priority for purposes of focusing. The computing system may then determine disparity information for each of one or more segments of the image frame, which each include at least one focus point, as shown by block 306b. Then, at block 306c, the computing system determines at least one focus setting based at least in part on the disparity in the one or more segments that include at least one focus point. The computing system may then configure at least one of its image-capture systems according to the at least one determined focus setting, as shown by block 306d.

At block 306d, the computing system may control a lens mechanism to set the lens' focus position such that the focus point is positioned within the depth-of-field of the lens. To do so, the computing system may utilize a mapping of certain disparity ranges to certain focus positions. More specifically, the disparity between two images of a scene captured from different perspectives is negatively correlated to the distance of objects in the scene. As a result, the disparity of an object decreases as the distance between the object and the camera lens increases, and vice versa. Thus, disparity provides an indication of distance. Accordingly, the mapping of disparity ranges to certain focus positions may be defined such that the focus position results in a depth of field that corresponds to the depth information provided by the disparity information for the scene.

In the case where only one segment includes a focus point or points, the device could simply determine the disparity information and/or the corresponding focus setting for that segment. Alternatively, a device could use focus settings for some or all segments, but weigh the local disparity information and/or a corresponding local focus setting for segments with focus points more heavily.

If focus points exist in multiple segments, then the device may use various techniques to determine a focus setting for the scene. For instance, the device might determine an average of the focus settings in only the segments where focus points exist, or might determine a spatially weighted average of all segments, in which greater weight is placed on segments that include focus point(s).

In some embodiments, a focus setting that is determined using an example method, such as method 300, may serve as a starting point for another focusing technique. For instance, a device may utilize a method such as method 300 to determine an initial focus setting (e.g., an initial lens position), and then use a contrast-detection AF or another AF technique to refine the focus setting. Note that when a device includes small-aperture cameras (as is the case in many mobile devices), the depth-of-field is wider than when cameras having larger apertures are used. Due to the wider depth-of-field, devices utilizing smaller-aperture cameras may not need to determine a focus setting with as much accuracy as when larger-aperture cameras are utilized. Thus, when smaller-aperture cameras are utilized, refinement of the focus setting (e.g., via a subsequent contrast-detection AF) may be unnecessary or less useful (but it is not ruled out as a possibility).

In a variation on the above-described implementations, a computing system may utilize the disparity information to generate a depth map for the scene, and then use the depth map to help an autofocus process. A depth map may indicate, for example, distance measures to certain objects or certain segments of the scene. This distance information may then be used to determine a focus position that provides a depth-of-field that includes certain objects or segments in the scene. For example, the computing system may determine the distance measure that corresponds to the location of the focus point within the imaging frame (e.g., a distance measure that the depth map specifies at the pixel coordinates of the focus point, or specifies for a segment of the image frame that includes the focus point). The computing system may control a lens mechanism to set the lens' focus position such that the focus point is positioned within the depth-of-field of the lens.

IV. Illustrative Autofocus Applications

Example methods, such as methods 300 and 350, may be utilized in conjunction with various types of AF processes.

As an example, a device such as a mobile phone with a touch-sensitive display may use disparity information, and possibly a depth map of the scene to help provide a "touch-to-focus" feature. More specifically, in a touch-to-focus application, such a device may display preview image data on its touch-sensitive display; essentially providing an electronic viewfinder on its display. The device may allow a user to select and focus on an element of interest in the scene by touching the display at the location where the element is displayed. Accordingly, when the device receives a data input corresponding to a touch gesture at a location on the touchpad display, the device may determine the location in the scene that is indicated by the touch gesture. The device may then use the determined location as a focus point for autofocus. In particular, the device may use a method such as method 350, and adjust the focus according to the disparity in a segment that includes the identified element. Alternatively, the disparity may be used to determine a distance to the identified element, and the device may adjust the focus according to the distance to the identified element (e.g., as indicated by the depth map of the scene).

As another example, an autofocus process may utilize disparity information and/or depth information for a scene in conjunction with a face-recognition process to focus a camera based on the location(s) of a face or face(s) in the scene. In a basic implementation, the face-recognition process may be implemented to detect a single face in image data of a scene, and focus point for method 350 may be set to the location of the face in the scene, such that disparity or depth information corresponding to the location of the face can be used to focus the camera.

In a scenario where multiple faces are detected, various processes for utilizing or selecting between multiple focus points may be implemented. For instance, once the locations of multiple faces in the scene are determined, disparity information or a depth map may be utilized to determine disparity and/or distance information corresponding to each face. The AF process may then select the focus setting in an effort to optimize the focus for as many faces as possible (e.g., by selecting a focus position of the lens that provides a depth of field including the greatest number of faces).

Additionally or alternatively, certain faces may be prioritized. For example, the AF process can prioritize a face or faces that are closer to the camera than other faces. Additionally or alternatively, the AF process can prioritize a face or faces that are closer to the center of the image frame. As another example, if the AF process can match faces to specific people (e.g., a user's friends), then the AF process may prioritize having the certain people's face(s) in focus. In any such case, the distance information provided by the depth map may be utilized to determine the focus setting that corresponds to the indicated distances to the faces that are prioritized.

As yet another example, a depth map may be utilized to help improve a focus tracking process, where the focus point follows a moving object in a scene. More specifically, when focus tracking is implemented, a camera attempts to maintain focus on an element even when its moves across a scene and/or moves farther away from or closer to the lens. (Note that the application of a depth map to focus tracking may be useful in both still-image capture and video recording.) By providing a better understanding of the structure of the scene and its elements, the segmentation of a depth map may facilitate a more intelligent decision about the significance of scene changes and their correspondence to motion of scene elements.

For example, if an object is only moving across a scene (e.g., moving horizontally with respect to the lens), and the distance to the object does not change significantly, then a focus adjustment is generally unnecessary. However, if a followed object moves further from or closer to the camera lens, then a focus adjustment may be required. Accordingly, a depth map may be updated periodically (and possibly in real-time), such that the depth map can be used to track the distance to a moving element over time. Accordingly, by monitoring the depth map for changes in the scene element's distance from the lens, a focus tracking process may determine when to adjust the focus to keep the scene element in focus.

V. Utilizing a Stereo Image Pair to Determine Disparity

In some embodiments, the determination of disparity information at block 304 may be based at least in part on the difference between two images of a scene which are captured by two image-capture systems that are oriented in substantially the same direction and have substantially overlapping fields of view (e.g., based on the disparity between images in a single stereo image pair). In such an embodiment, the disparity information that is determined at block 304 may indicate the disparity due to parallax between the two images of the scene. Various techniques may be utilized to determine the disparity due to parallax from a single stereo image pair.

In some embodiments, an example embodiment may incorporate various known techniques that involve determining the spatial optical flow between images in a stereo image pair of a scene, or performing feature matching between images in a stereo image pair of a scene, to determine disparity information.

In other embodiments, the disparity due to parallax may be determined from a stereo image pair without computationally-intensive techniques such as determining the spatial optical flow between images of a scene and/or applying a feature mapping technique to images of a scene. In such embodiments, the disparity due to parallax may be determined by analyzing the difference between the images in the stereo pair.

More specifically, the difference between the two images in a stereo image pair may be determined by subtracting one image from the other (a process which may also be referred to as "differencing" the two images). However, the difference obtained by subtracting two images of a scene may be indicative of both: (1) disparities caused by parallax and (2) the amount of contrast (e.g., in the color, brightness, and/or texture) of the scene itself. Further, it may not be readily apparent, from the difference image alone, which portion of the difference results from parallax and which portion of the difference results from contrast in the scene. Thus, the difference that is determined for two different scenes that include objects at the same distance, but which have different amounts of contrast, can vary significantly. As a result, using the difference alone to determine a focus setting may be unreliable, since the difference obtained by, e.g., subtracting one image of a scene from another, may not isolate the disparity due to parallax.

Figure 4A:
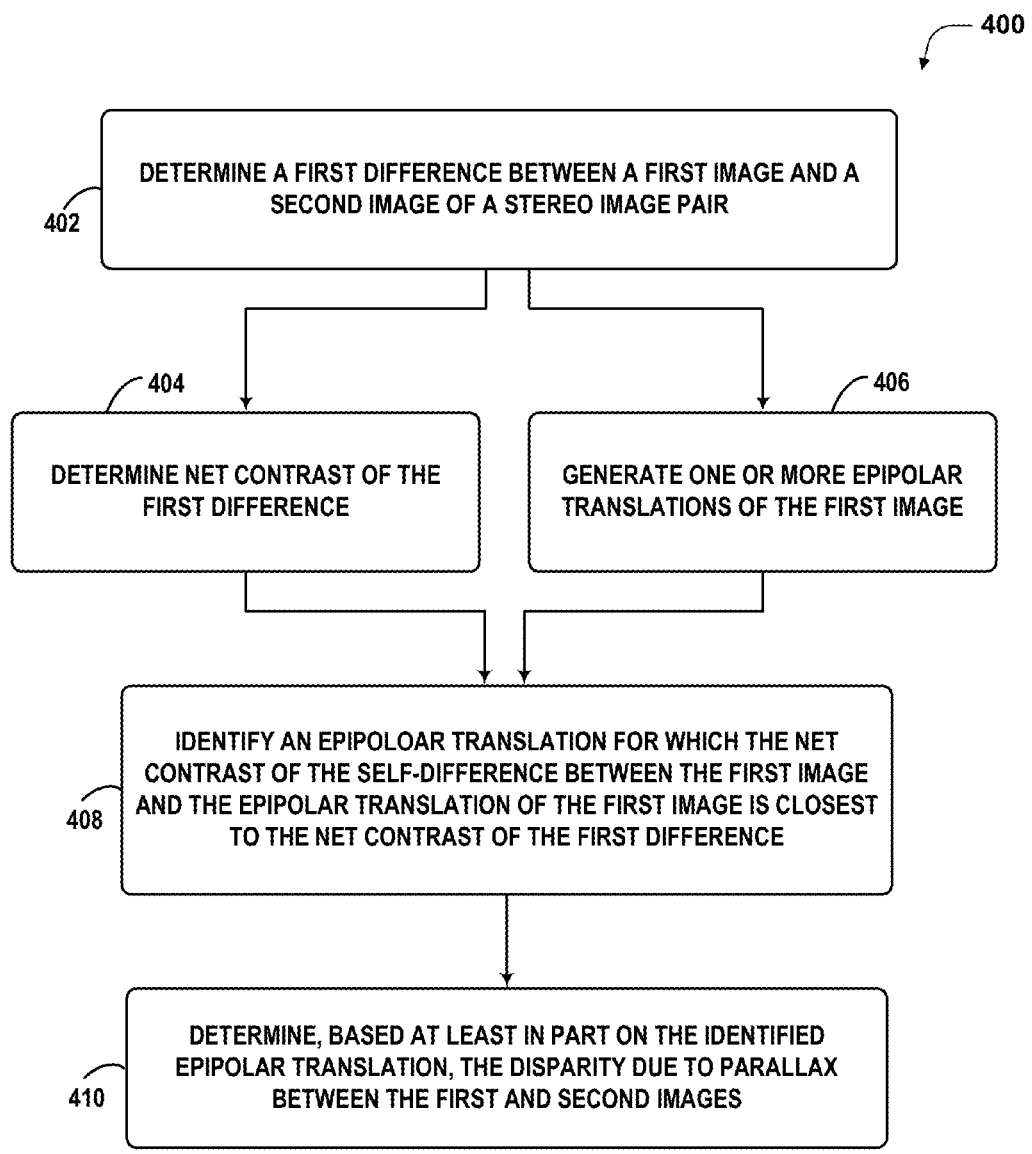
FIG. 4A is flow chart showing a method for determining the disparity between two images of a scene, according to an example embodiment

Accordingly, in some embodiments, techniques may be used to estimate the portion of the difference between two images that results from parallax between the two images. For example, FIG. 4A is flow chart showing a method 400 for determining the disparity between two images of a scene, according to an example embodiment. Method 400 may be implemented as a sub-process of method 300 (e.g., at block 304), and/or may be implemented in other scenarios as well.

As shown by block 402, method 400 involves a computing system determining a first difference between a first image and a second image in a stereo image pair. The images in the stereo image pair may be captured by a first image-capture system and a second image-capture system. The lenses of the first and second image-capture systems may be arranged on the same side of a device and oriented in substantially the same direction, such that the fields of view of the first and second image-capture systems are substantially overlapping. Further, the first difference may take the form of a difference image that indicates the difference between the first and second images.

The computing system may then determine a net contrast of the first difference, as shown by block 404. The computing device may also determine the net contrast in the scene at various spatial frequencies. To do so, the computing device also generates one or more epipolar translations of the first image, as shown by block 406. In an example embodiment, each epipolar translation is generated by translating the first image in a direction that is parallel to the baseline formed by the first image-capture system and a second image-capture system. Further, each epipolar translation may translate the first image by a different number of pixels than the other epipolar translations. After generating one or more epipolar translations, the computing device may identify a given epipolar translation of the first image, for which (a) the net contrast of the self-difference between the first image and the epipolar translation, is closest to (b) the net contrast of the first difference, as shown by block 408.

To illustrate a possible implementation of blocks 402 to 408, consider a scenario where the computing system determines n epipolar translations (e.g., $T_{i=1\ to\ n}$) of the first image. In this scenario, the computing system may determine a self-difference $D_i$ between each of the n epipolar translations and the original first image. The computing system may then determine the respective net contrast M[i] for each of the self-differences $D_{i=1\ to\ n}$. After determining the net contrast M[i] for each self-difference $D_{i=1\ to\ n}$, the computing system may individually compare each net contrast M[i] to the net contrast of the first difference that was determined at block 404, and identify the epipolar translation $T_i$ corresponding to the net contrast M[i] that is closest to the net contrast of the first difference.

At block 410, the computing system may determine, based at least in part on the epipolar translation that was identified at block 408, the disparity due to parallax between the first image and the second image. In particular, the number of pixels by which the identified translation $T_i$ is shifted from the original first image may indicate the amount of shift that was due to parallax, independent from the effect of scene contrast in the difference between the first and second images (or at least close enough to independent to be useful).

In some implementations, method 400 may be applied to determine the overall disparity for a scene. For example, at block 408, the computing device may perform method 400 for all pixels in the image frame, or for a selective sampling of the pixels in the image frame. Then, at block 410, the computing system may determine the overall disparity due to parallax by determining the average pixel shift across the entire image frame (e.g., the average number of pixels of shift between the first image and the second image).

In other implementations, the same or similar processes as those utilized in method 400 may be separately applied to individual segments of the image frame, in order to determine the local disparity due to parallax of the scene in each of the segments. More specifically, a scene may be segmented, and the variation in disparity may be analyzed on a segment-by-segment basis. (Note that in some cases, segmentation of a scene may be implemented by segmentation of the image frame in images of the scene.) Those skilled in the art will thus understand that aspects and techniques described in reference to FIG. 4A in the context of the scene as a whole, may also be incorporated when determining disparity information for a portion or segment of a scene, such the method 450 described below in reference to FIG. 4B.

Figure 4B:
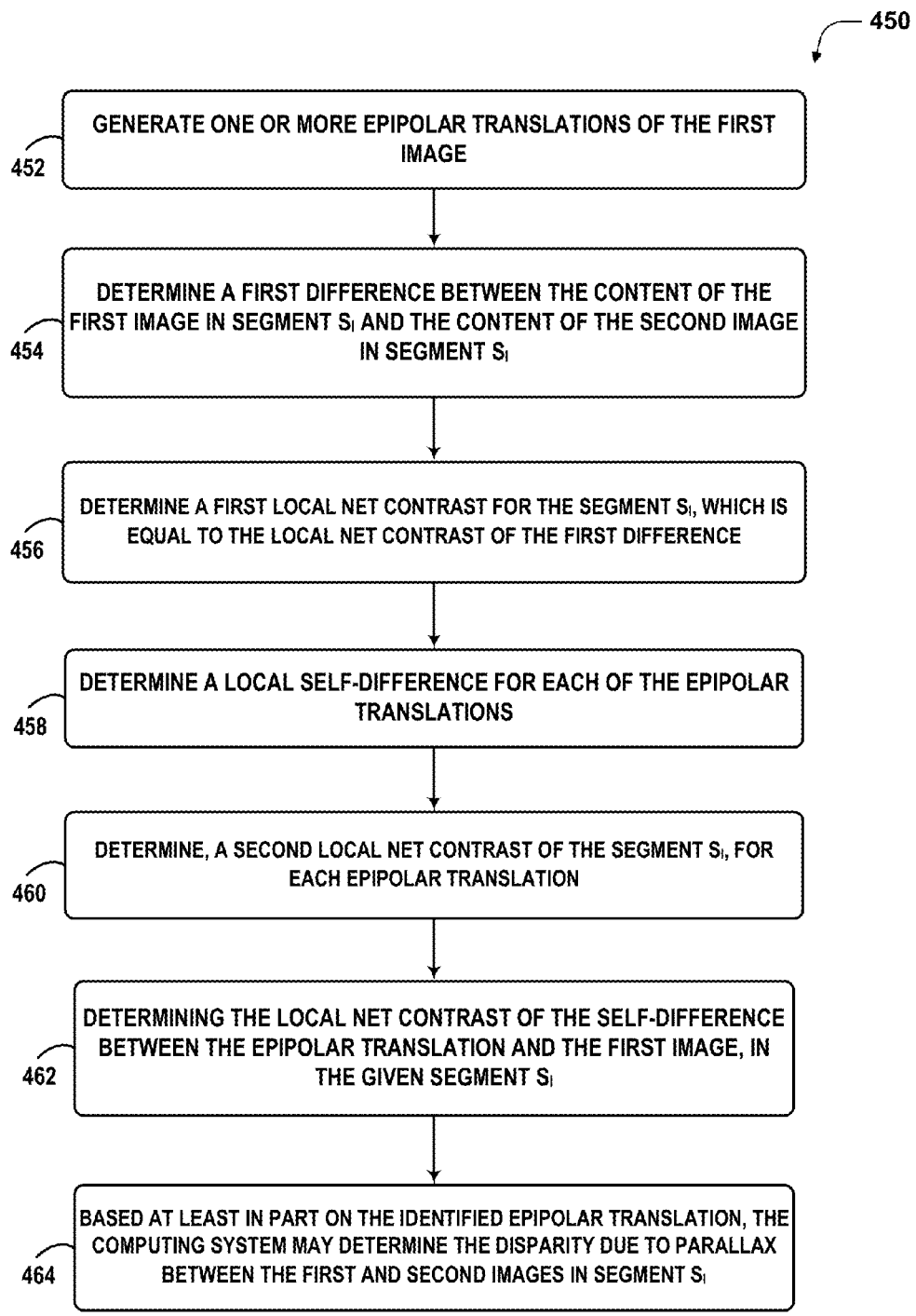
FIG. 4B is flow chart illustrating a method for determining segmented disparity information, according to an example embodiment.

More specifically, FIG. 4B is a flow chart illustrating a method 450 for determining segmented disparity information, according to an example embodiment. Method 450 may be implemented as a sub-process of method 300 (e.g., at block 304), and may be implemented in other scenarios as well.

Method 450 involves a computing device generating one or more epipolar translations of the first image, as shown by block 452. The computing system may then use the segments of each epipolar translation to determine the local disparity due to parallax in each of one or more segments in the image frame. In an example embodiment, the computing system may determine the local disparity due to parallax in each of a number of segments $S_{i=1\ to\ n}$ in the image frame, and possibly in all segments.

More specifically, in order to determine the local disparity due to parallax in a given segment $S_i$, the computing system may determine a first difference between the content of the first image in segment $S_i$ and the content of the second image in segment $S_i$, as shown by block 454. As shown by block 456, the computing system may then determine a first local net contrast for the segment $S_i$, which is equal to the local net contrast of the first difference.

The computing system may also determine a local self-difference for each of the epipolar translations, as shown by block 458. The local self-difference for a given epipolar translation may be determined by calculating the difference between: (a) the portion of the first image that is within segment $S_i$ of the image frame, and (b) the portion of the given epipolar translation of the first image that is within segment $S_i$. The computing system may also determine, a second local net contrast of the segment $S_i$, for each epipolar translation, as shown by block 460. For a given epipolar translation, the second local net contrast may be determined by determining the local net contrast of the self-difference between the epipolar translation and the first image, in the given segment $S_i$.

As shown by block 462, the computing system may then identify one of the epipolar translations for which the second local net contrast of segment $S_i$ (e.g., net contrast of a difference image that indicates the difference between the first image and the epipolar translation of the first image, in segment $S_i$), is closest to the local net contrast of the first difference (e.g., net contrast of a difference image that indicates the difference between the first image and the second image, in segment $S_i$). Based at least in part on the identified epipolar translation, the computing system may determine the disparity due to parallax between the first and second images in segment $S_i$, as shown by block 464. In particular, the disparity due to parallax for the segment $S_i$ may be determined to be the number of pixels by which the identified epipolar translation of the first image is shifted from the original first. Further, blocks 454 to 464 may be repeated for some or all of the segments in the image frame, in order to determine a respective local disparity due to parallax for some or all of the segments.

Referring back to FIG. 4A, in a variation on method 400, the computing system might not identify the translation $T_i$ for which the corresponding net contrast M[i] is closest to net contrast of the difference between the first and second images. Instead, the computing device may identify a net contrast M[i] that varies from the net contrast of the first difference by less than a threshold amount, and then identify the epipolar translation that corresponds to the identified net contrast M[i]. Note that in such an embodiment, the computing system may generate one translation $T_i$ at a time, and/or may determine one self-difference $D_i$ at a time. As such, the computing system may select the first translation Ti for which the corresponding net contrast M[i] varies from the net contrast of the first difference by less than the threshold.

In some cases, before identifying an epipolar translation for which the net contrast of the self-difference is closest to the net contrast of the stereo image pair, the computing system may fit the net contrasts of a sampling of self-differences to a curve. The computing system may interpolate between the known net-contrast values on the curve to obtain values for other epipolar translations without actually creating the other translations, and/or may generate self-difference images for the other translations. The computing system may then identify an epipolar translation for which the net contrast of the self-difference is closest to the net contrast of the stereo image pair, which in this case may be an epipolar translation for which a self-difference and corresponding net contrast were actually determined, or another epipolar translation for which the associated net contrast was estimated from the curve.

Note that the number of translations and/or the sizes of the translations that are determined and/or utilized in method 400 may vary, depending upon the particular implementation. In one implementation, an epipolar translation may be generated and/or evaluated for every possible pixel-shift size. For example, if the first image is 1024 pixels wide along on axis that is parallel to the baseline of the cameras that captured the stereo image pair, then the computing system may generate 1024 epipolar translations (e.g., with shifts of 1 pixel, 2 pixels, 3 pixels, . . . 1024 pixels).

In other implementations, an epipolar translation may be generated and/or evaluated for a sampling of pixel-shift sizes. For example, an epipolar translation may be evaluated for a set of translation sizes s[i] equal to $2^i$, for i equal 1 to n (with $2^n$ being less than or equal to the width of the first image along on axis that is parallel to the baseline). As an example, if the first image is 1024 pixels wide along an axis parallel to the baseline, the computing system may generate and evaluate epipolar translations of sizes 1, 2, 4, 8, 16, . . . 1024 pixels. Other options are also possible.

In some embodiments, to reduce the computational cost of spatial-domain techniques, such as methods 400 and 450, the difference(s) between images in the stereo image pair(s) and self-differences may be calculated for "slices" of the image frame, which are parallel to the baseline of the image-capture systems that captured the stereo image pair. For example, epipolar lines that are 1-pixel wide could be sampled at every nth pixel (e.g., such that there is an epipolar "slice" at every $10^{th}$ pixel). Other examples are possible. The differencing processes could then be performed on the sample slices of the images in the stereo image pair and the epipolar translations, which may help to reduce computational cost and increase the speed with which disparity information can be determined for a scene.

In some embodiments, the computer system may apply an interval-halving process to identify an epipolar translation for which the net contrast of the self-difference is closest to the net contrast of the stereo image pair (or in other cases, that differs from the net contrast of the stereo image pair by less than a threshold).

Figure 5:
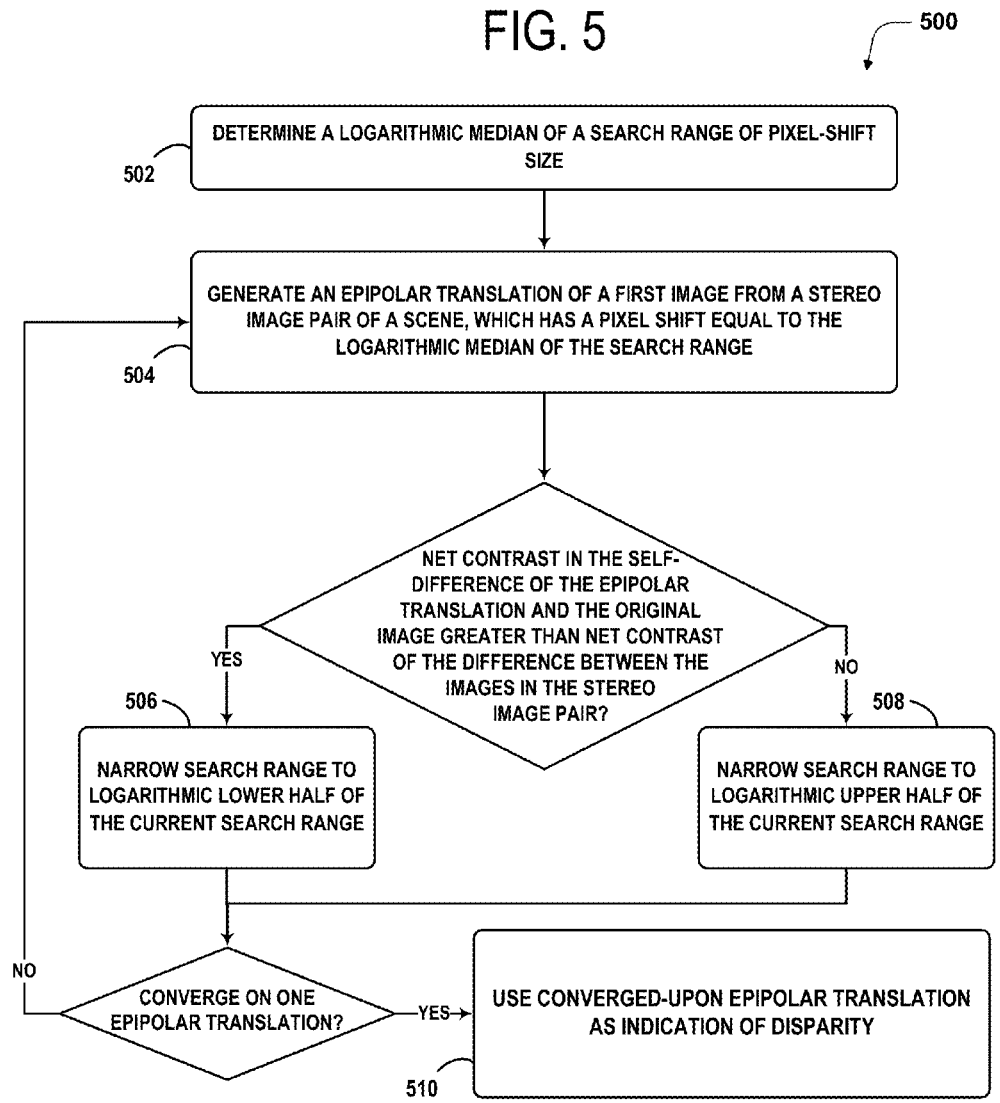
FIG. 5 is a flow chart illustrating an interval-halving process, according to an example embodiment.

For example, FIG. 5 is a flow chart illustrating an interval-halving process 500, according to an example embodiment. In particular, the interval-halving process 500 may involve determining a logarithmic median of a search range of pixel-shift sizes, as shown by block 502. A computing system may then generate an epipolar translation of the first image, which has a pixel shift equal to the logarithmic median of the search range, as shown by block 504. Note that herein, a difference which is determined between an image and an epipolar translation of the image may be referred to as a "self-difference."

If the net contrast in the self-difference between the epipolar translation generated at block 504 and the original image is higher than the net contrast of the difference between the images in the stereo image pair, then the search range is narrowed to the logarithmic lower half of the existing search range, as shown by block 506. On the other hand, if the net contrast in the self-difference is lower than the net contrast of the difference between the images in the stereo image pair, the search range is narrowed to the logarithmic upper half of the existing search range, as shown by block 508. Blocks 502 to 508 may then be repeated until the process converges on one epipolar translation, which may then be used as indication of disparity, as shown by block 510.

As a specific example, consider an implementation of method 500 in which the initial pixel-shift search range is 1 pixel through 1024 pixels. The logarithmic median of the initial search range is thus 32 pixels. Accordingly, computing system may then generate an epipolar translation of the first image that is shifted by 32 pixels along an axis parallel to the baseline of the cameras that captured the stereo image pair. The computing system may then determine the self-difference of the 32-pixel epipolar translation and the original image, as well as the net contrast of the self-difference. If the net contrast is higher than the net contrast corresponding to the stereo image pair, then the search range may be narrowed to 1 pixel through 32 pixels. On the other hand, if the net contrast is lower than the net contrast corresponding to the stereo image pair, then the search range may be narrowed to 32 pixels through 1024 pixels. The logarithmic median of the narrowed search range may then be determined, and the process repeated until there is convergence on a particular epipolar translation.

Note that while the above examples describe spatial-domain analysis of a stereo image pair, it is possible that frequency-domain analysis of a stereo image pair may be used to extract the disparity due to parallax from the difference between the images in the stereo image pair.

VI. Using Multiple Stereo Image Pairs to Determine Disparity and a Corresponding Focus Setting for a Scene In some embodiments, a multi-camera device may use three or more cameras with lenses that are oriented in substantially the same direction, and have overlapping fields of view, to capture images of the scene. As such, stereo image pairs may be captured by two or more camera pairs that have different baselines. Accordingly, at block 302 of method 300, the received image data may include two or more stereo image pairs, where each stereo image pair is captured by a camera pair with a different baseline.

In such an embodiment, block 304 may involve determining the disparity for each of two or more stereo image pairs of a scene (e.g., using one of the techniques described herein or another technique). The variation in disparity may provide an indication of depth in the scene, and can thus be used to determine a focus setting corresponding to the scene. Specifically, the computing system may determine: (a) the variation in the magnitude of the disparity across two or more stereo image pairs and (b) the variation in baseline length over the camera pairs that are used to capture these stereo image pairs. The change in the magnitude of the disparity relative to the change in baseline length may then be analyzed to determine depth information for the scene.

For example, when: (a) a first image pair captured with a larger baseline and (b) a second image pair captured with a smaller baseline, the change in disparity between the first and second image pairs will typically be much smaller (and possibly even undetectable) when the objects in a scene are far away. However, when the objects in a scene are close to the device, the change in disparity between such first and second image pairs will be greater. Accordingly, the change in disparity between such first and second image pairs may be indicative of the depth of the scene (or the depths of particular objects or segments in the scene), which may then be used to determine a focus setting.

For example, consider a scenario where two stereo image pairs of a scene are utilized, and thus provide disparity information resulting from two different baselines. If the disparity variation is greater than some threshold (or possibly even just detectable), then the device may select a focus setting appropriate for a near-field focusing distance. And, if the disparity variation is less than some threshold (or possibly only when not detectable), then the device may select a focus setting appropriate for a far-field focusing distance. Other examples are possible.

Figure 6A:
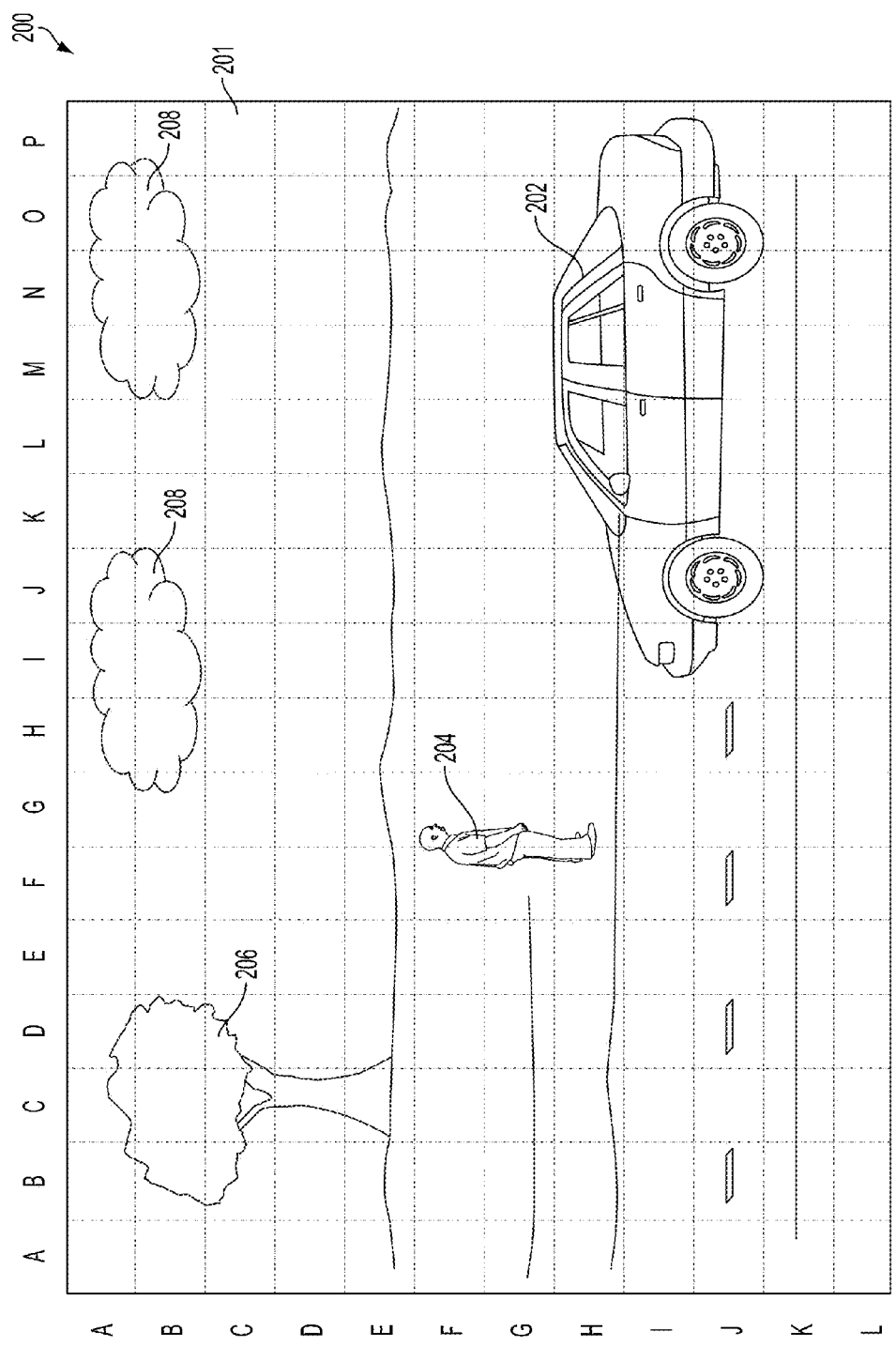
FIG. 6A illustrates a scene for which an autofocus process could be enhanced via an example method.

To provide another example of how the variation in disparity can be used to determine a focus setting, FIG. 6A illustrates a scene 600 for which an autofocus process could be enhanced via an example method. In particular, a multi-camera device may use two or more camera pairs having different baselines to capture stereo image pairs of the scene 600.

In the illustrated example, scene 600 includes a car 602, a person 604, a tree 606, and clouds 608. Further, the scene 600 may be segmented into a 16×12 grid within the image frame 601. In the illustrated example, the segments of image frame 601 are labeled with (x, y) coordinates, where x=A to P and y=A to L.

The multi-camera device (or a computing system therein) may determine the local disparity at each segment (A, A) to (P, L), for each stereo image pair. Thus, two or more disparity values may be determined for each individual segment (A, A) to (P, L) with each disparity value corresponding to a different stereo image pair (and thus to a different baseline). Then, for each segment, the device may determine the variation in disparity across the disparity values corresponding the different stereo image pairs.

Figure 6B:
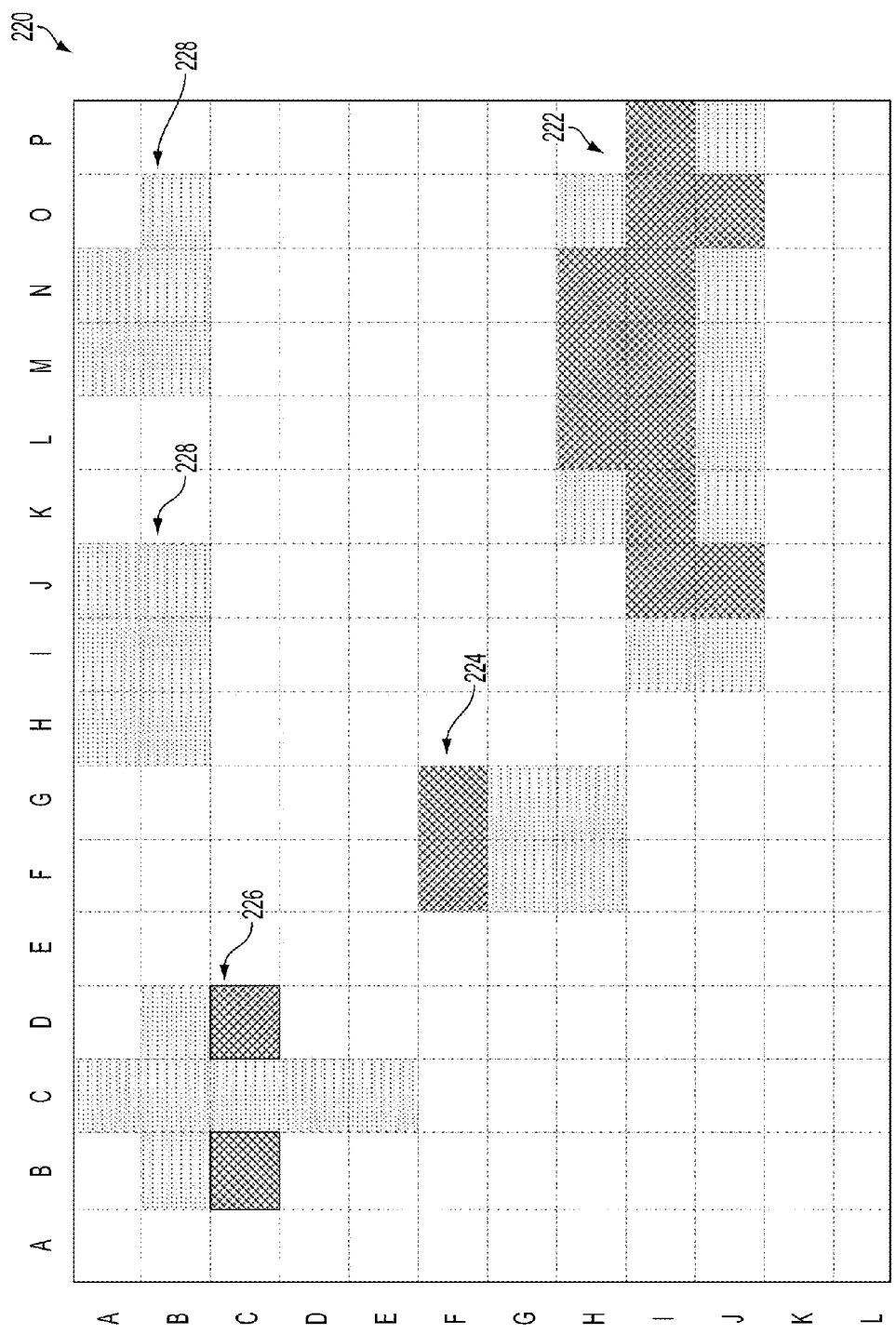
FIG. 6B visually illustrates a segment-by-segment disparity variation corresponding to the scene shown in FIG. 6A.

FIG. 6B visually illustrates a segment-by-segment disparity variation 620 corresponding to the scene 600 shown in FIG. 6A. For ease of reference, the segment-by-segment disparity variation 620 may also be referred to as a disparity-variation map. In disparity-variation map 620, each segment (A, A) to (P, L) is shaded to indicate a local disparity variation for a particular segment in the image frame, with darker shading indicating greater disparity variation.

As noted, the variation in disparity across two or more stereo image pairs captured with different baselines typically increases the closer an object is to the lens, and vice versa. In scene 600, the car 606 may be closer to the camera lenses than person 604, who is closer than tree 606, which in turn is closer than clouds 608. Thus, in disparity-variation map 620, the segments in area 622 that correspond to the car 602 may generally be darker than the segments in area 624 that correspond to the person 604, which are darker than the segments in area 626 that correspond to the tree 606, which in turn are darker than the segment in areas 628, which correspond to the clouds 608.

Further, the depth information provided by the segment-by-segment analysis of disparity variation may be used to help an autofocus process that is applied to the scene 600. In particular, the depth information provided by the disparity variation in a particular segment may be used to determine a focus setting for the particular segment. In particular, an individual segment may be assigned a focus setting such that the object or objects in the segment are in focus (e.g., a lens position such that the focusing distance(s) for the object(s) in the segment are within the depth of field of the lens).

Figure 6C:
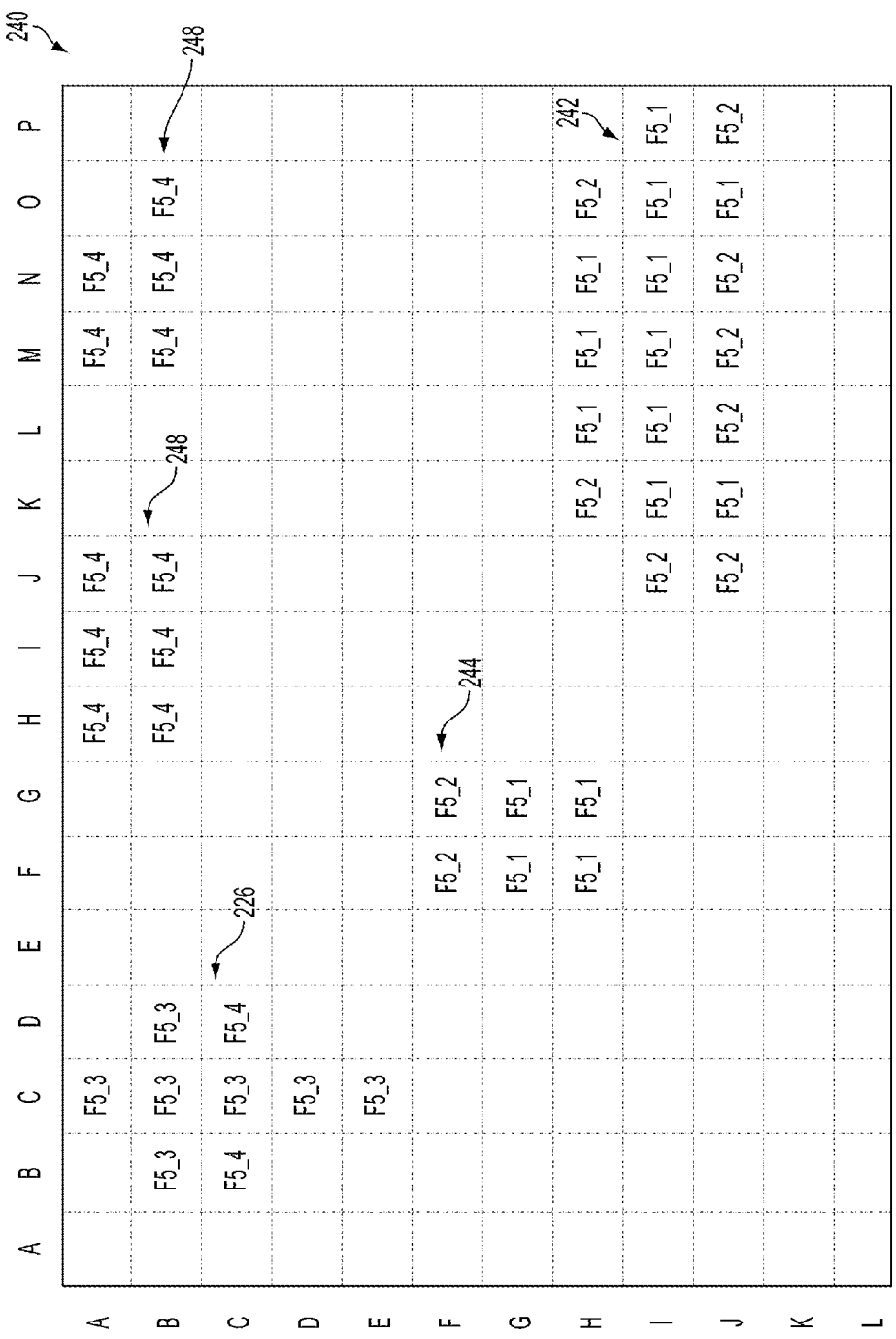
FIG. 6C shows an example of segment-by-segment focus settings that might be determined for scene shown in FIG. 6A.

For example, FIG. 6C shows an example of segment-by-segment focus settings 640 that might be determined for scene 600. (For ease of reference, the segment-by-segment focus settings 640 may also be referred to as a "focus map" 640.) In focus map 640, the segments in the area 642, which corresponds to the car 602 in scene 600, may generally have a first focus setting FS_1 (although some of the segments at the edge of the car have a second focus setting FS_2). The segments in the area 644, which corresponds to the person 604 in scene 600, have either the first focus setting FS_1 or the second focus setting FS_2. The segments in the area 646, which corresponds to the tree 606 in scene 600, may generally have a third focus setting FS_3 (although some of the segments at the edge of the tree have a fourth focus setting FS_4). Further, the segments in the areas 648, which correspond to the clouds 608 in scene 600, generally have the fourth focus setting FS_4.

Once the device has determined segment-by-segment focus settings, the device may use those in an autofocus process. For example, the device may determine a focus point or focus points in the scene, and identify the segment or segments that include the focus points. As a specific example, to focus on the car 606, focus points may be identified in one or more segments in the area 642 that corresponds to the car. Thus, in the illustrated example, the device may use the first focal setting FS_1. Alternatively, the device might apply a face-detection process to determine that focus point(s) exist in segment (F, F) and/or segment (G, F). In such case, the device may use the second focal setting FS_2.

Note that instead of determining a focus setting for each area, as was described in reference to FIG. 6C, a computing system may instead determine a disparity due to parallax in each area (e.g., an average pixel shift in each area). A weighted average of the pixel shift could then be determined to determine an overall average pixel shift for the scene to use for purposes of focusing. A disparity-to-focus-setting mapping could then be used to determine a focus setting that corresponds to the overall average pixel shift for the scene. Alternatively, the computing system could use the overall average pixel shift to determine an average depth for the scene. A depth-to-focus-setting mapping could then be used to determine a focus setting that corresponds to the average depth for the scene.

VII. Generating a Depth Map

In a further aspect, depth information may be determined from the disparity information that is determined at block 304 of method 300. As such, the disparity information may be utilized to generate a depth map of the scene. The depth map may then be used help determine focus settings for the scene and/or may be used for other purposes.

In some cases, the scene may be segmented (e.g., into a 16×12 grid), and the disparity and/or variation in disparity may be analyzed on a segment-by-segment basis. In such case, the segmented disparity information may provide a "rough" depth map of the scene, with depth information provided on a segment-by-segment basis.

For example, FIG. 6B may alternatively be characterized as illustrating a depth map 620 that corresponds and is determined based on disparity information for the scene 600 shown in FIG. 6A. More specifically, in FIG. 6B, each segment (A, A) to (P, L) may be shaded to indicate a depth range for the particular segment, with darker shading indicating object(s) in the segment are closer to the device. Thus, when viewing FIG. 6B as showing a depth map, the area 622 corresponding to the car 602 may generally be darker than the area 624 corresponding to the person 604, which is darker than the area 626 corresponding to the tree 606, which in turn is darker than the areas 628 corresponding to the clouds.

Other techniques may also be used to generate a depth map. For instance, any depth-from-stereo extraction technique may be utilized. Such techniques typically involve determining corresponding features in two images and measuring the spatial disparity in the two images, with greater disparity indicating features of the scene that are closer to the camera, and smaller disparity indicating features that are farther from the camera.

VIII. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:
1. A method comprising:
receiving, by a computing system, image data of a scene, wherein the image data comprises image data captured by each of three or more image-capture systems of a computing device that includes a plurality of image-capture systems, wherein the three or more image- capture systems collectively provide two or more pairs of image-capture systems having two or more different baselines;

processing, by the computing system, the image data to determine disparity information comprising a variation in magnitude of the disparity across respective stereoscopic image data captured by the two or more pairs of image-capture systems; and performing, by the computing system, an autofocus process based at least in part on the disparity information, wherein the autofocus process provides a focus setting for at least one of the image-capture systems of the computing device.

2. The method of claim 1, wherein determining the disparity information for the scene further comprises determining an overall disparity for the scene.

3. The method of claim 1, wherein the scene is divided into a plurality of segments, and wherein determining the disparity information for the scene further comprises determining a local disparity for each of two or more segments of the scene.

4. The method of claim 1, wherein the image data of the scene captured by each of the two or more image-capture systems is captured simultaneously, and wherein determining the disparity information for the scene further comprises:
 determining correspondence data indicating correspondence between the image data of the scene captured by a first of the three or more image-capture systems and the image data of the scene captured by a second of the three or more image-capture systems; and
 determining, based on the correspondence data, disparity between at least a portion of the image data of the scene captured by the first of the three or more image-capture systems and at a corresponding portion of the image data of the scene captured by the second of the three or more image-capture systems.

5. The method of claim 4, wherein determining the correspondence data comprises determining a spatial optical flow between the image data of the scene captured by the first of the three or more image-capture systems and the image data of the scene captured by the second of the three or more image-capture systems.

6. The method of claim 1, wherein the disparity information indicates disparity due to parallax, between image data of the scene captured by a first and a second of the three or more image-capture systems.

7. A method comprising:
 receiving, by a computing system, image data of a scene, wherein the image data comprises image data captured by each of two or more image-capture systems of a computing device that includes a plurality of image-capture systems;
 determining a disparity for the scene based at least in part on both (a) a local disparity for each of one or more selected focus segments in the scene and (b) a local disparity for each of one or more other segments, wherein the determination of the disparity places greater weight on the local disparity for each of the one or more selected focus segments than is placed on the local disparity for each of the one or more other segments; and
 performing, by the computing system, an autofocus process based at least in part on the determined disparity for the scene, wherein the autofocus process provides a focus setting for at least one of the image-capture systems.

8. The method of claim 7, further comprising:
 displaying, on a touchpad display of the computing system, image data of the scene;
 receiving data input corresponding to a touch gesture at a location on the touchpad display that corresponds to a first image-frame location in image data of the scene; and
 selecting a focus segment corresponding to the first image-frame location as one of the one or more selected focus segments.

9. The method of claim 7, wherein determining the at least one focus point in the scene comprises:
 detecting at least one face in image data of the scene;
 determining a location of the at least one face in image data of the scene; and
 using an image segment corresponding to the at least one face as one of the selected focus segments.

10. A method comprising:
 receiving, by a computing system, image data of a scene captured by a plurality of image-capture systems of a computing device, wherein the image data comprises at least a first image captured by a first of the image-capture systems and a second image captured by a second of the image-capture systems;
 determining disparity information for the scene, wherein determining the disparity information comprises:
  generating one or more epipolar translations of a first image; and
  using the one or more epipolar translations as a basis for determining disparity due to parallax between the first image and the second image;
 performing, by the computing system, an autofocus process based at least in part on the disparity information, wherein the autofocus process provides a focus setting for at least one of the image-capture systems.

11. The method of claim 10, wherein an image frame of the first image and an image frame of the second image are each divided into a respective plurality of segments, and wherein determining the disparity due to parallax between the first image and the second image comprises:
 for each of one or more of the plurality of segments in the first image:
  determining the first difference between the segment of the first image and a corresponding segment of the second image;
  determining the local net contrast of the first difference;
  identifying a given epipolar translation from the one or more epipolar translations for which: (a) a local net contrast of a difference between the corresponding segment of the given epipolar translation and the segment first image is closest to (b) the local net contrast of the first difference; and
  determining, based at least in part on the identified epipolar translation, disparity due to parallax between the segment first image and the corresponding segment of the second image.

12. The method of claim 10, wherein performing an autofocus process based at least in part on the disparity information further comprises:
 determining, based on the disparity information, depth information for the scene; and
 using the depth information as a further basis for performing the autofocus process.

13. The method of claim 12, wherein determining depth information for the scene comprises generating a depth map for the scene.

14. The method of claim 10, wherein performing the autofocus process further comprises:

determining, by the computing system, at least one focus point in the scene;

using the disparity information as a basis for determining, by the computing system, depth information for the at least one focus point;

determining, by the computing system, at least one focus setting that corresponds to an indication of depth at the least one focus point, wherein the indication of depth is provided by the depth information; and configuring the at least one of the image-capture systems according to the at least one determined focus setting.

15. A system comprising:

a plurality of image-capture systems that are oriented in the same direction; and a control system configured to:

receive image data of a scene, wherein the image data comprises image data captured by each of two or more of the image-capture systems;

determine a disparity for the scene based at least in part on both (a) a local disparity for each of one or more selected focus segments in the scene and (b) a local disparity for each of one or more other segments, wherein the determination of the disparity places greater weight on the local disparity for each of the one or more selected focus segments than is placed on the local disparity for each of the one or more other segments; and perform an autofocus process based at least in part on the disparity information for the scene, wherein the autofocus process provides a focus setting for at least one of the image-capture systems.

16. The system of claim 15, wherein the system is implemented in or takes the form of a mobile device.

17. The system of claim 16, wherein the plurality of image-capture systems comprise a plurality of rear-facing cameras on a back surface of the mobile device.

18. A non-transitory computer readable medium having stored therein instructions executable by a computing device to cause the computing device to perform functions comprising:

receiving image data of a scene, wherein the image data comprises image data captured by each of two or more image-capture systems of a computing device that includes a plurality of image-capture systems;

determining a disparity for the scene based at least in part on both (a) a local disparity for each of one or more selected focus segments in the scene and (b) a local disparity for each of one or more other segments, wherein the determination of the disparity places greater weight on the local disparity for each of the one or more selected focus segments than is placed on the local disparity for each of the one or more other segments; and performing an autofocus process based at least in part on the disparity information, wherein the autofocus process provides a focus setting for at least one of the image-capture systems of the computing device.

* * * * *